United States Patent [19]

Akiyama et al.

[11] Patent Number: 5,704,019
[45] Date of Patent: Dec. 30, 1997

[54] RESOLUTION CONVERSION METHOD AND APPARATUS

[75] Inventors: Yuji Akiyama; Kazuhiko Morimura, both of Yokohama; Masashi Matsumoto, Kawasaki; Sadayuki Sugama, Tsukuba; Masashi Kamada, Kawasaki; Takayuki Ninomiya, Ichikawa, all of Japan

[73] Assignee: Canon Kabushiki Kaisha, Tokyo, Japan

[21] Appl. No.: 245,634

[22] Filed: May 18, 1994

[30] Foreign Application Priority Data

May 20, 1993 [JP] Japan .................. 5-118529

[51] Int. Cl.$^6$ .............. H04N 1/40; H04N 1/393; G06K 9/42; G06K 9/44
[52] U.S. Cl. .......... 395/101; 358/447; 358/451; 382/298; 382/299; 382/258
[58] Field of Search .............. 395/101; 358/455, 358/456, 447, 448, 451, 457; 382/298, 299, 300, 258

[56] References Cited

U.S. PATENT DOCUMENTS

| | | | |
|---|---|---|---|
| 4,010,446 | 3/1977 | Kawa | 382/258 |
| 4,827,349 | 5/1989 | Ogata et al. | 358/434 |
| 4,872,064 | 10/1989 | Tutt et al. | 358/464 |
| 5,335,296 | 8/1994 | Larkin et al. | 382/298 |
| 5,537,496 | 7/1996 | Katayama | 382/272 |
| 5,539,843 | 7/1996 | Murakami et al. | 358/456 |

FOREIGN PATENT DOCUMENTS

| | | |
|---|---|---|
| 0574245 | 12/1993 | European Pat. Off. |
| WO88-08236 | 10/1988 | WIPO |

Primary Examiner—Kim Vu
Assistant Examiner—Tia M. Harris
Attorney, Agent, or Firm—Fitzpatrick, Cella, Harper & Scinto

[57] ABSTRACT

Data processing method and apparatus for converting data such as character data or image data of a resolution X into data of a resolution Y which are effective for use in, particularly, a recording apparatus such as an ink jet printer or the like. The data processing method comprises a first dividing step of dividing the data of the resolution X in the main-scan direction every A bits; a first converting step of converting the divided A-bit data into the B-bit data of the bit number B by using a first conversion pattern table; a second dividing step of dividing the data which was obtained by repeating the conversion by the first converting step by a number of times as many as a plurality of lines in the sub-scan direction every A bits; a second converting step of converting the divided A-bit data into the B-bit data of the bit number B by using a second conversion pattern table; and a reducing step of reducing the data of the resolution Y obtained by the second converting step by a thinning process by using a third conversion pattern table.

25 Claims, 25 Drawing Sheets

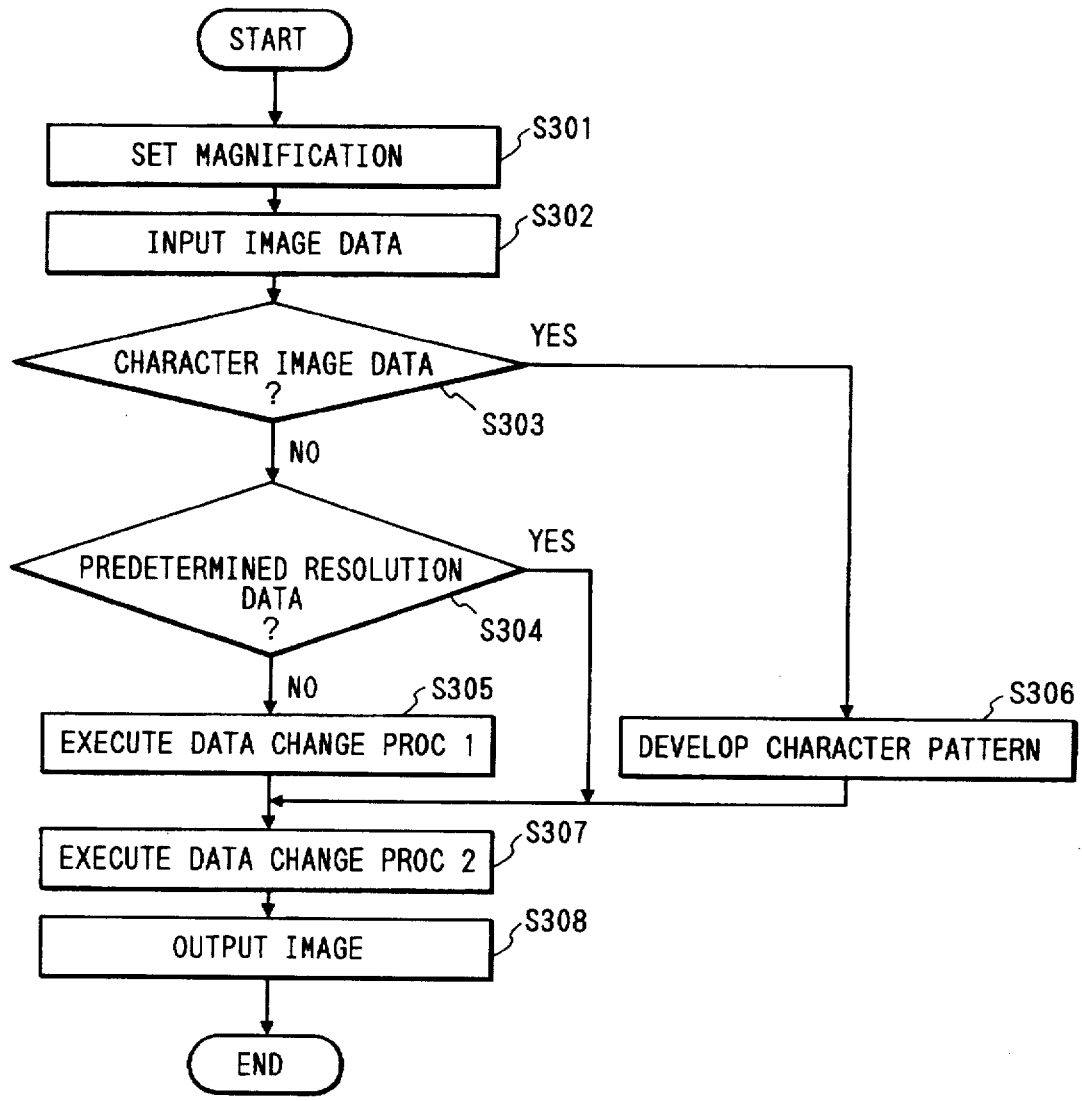

FIG. 4A
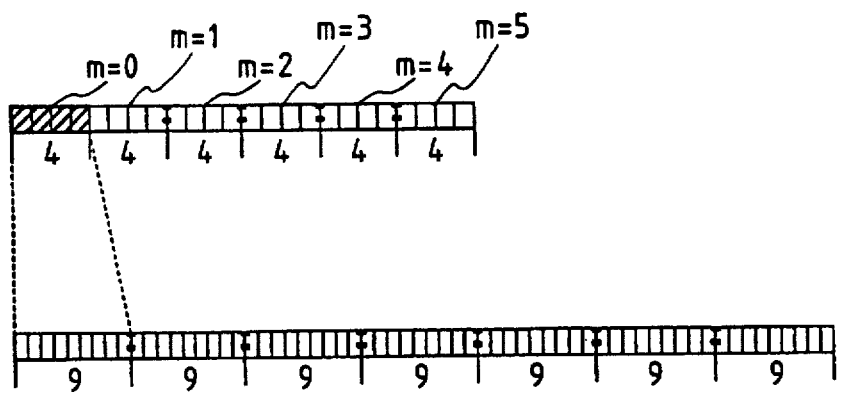
FIG. 4B SUB-SCAN DIRECTION
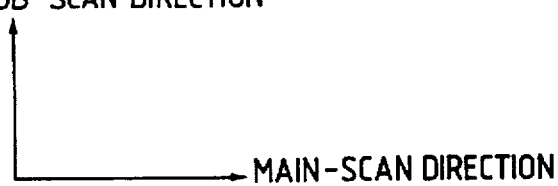
→ MAIN-SCAN DIRECTION
FIG. 4C
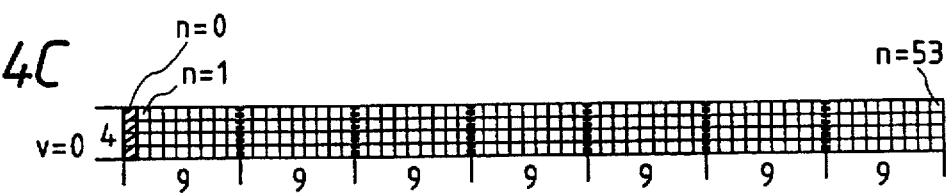
FIG. 4D
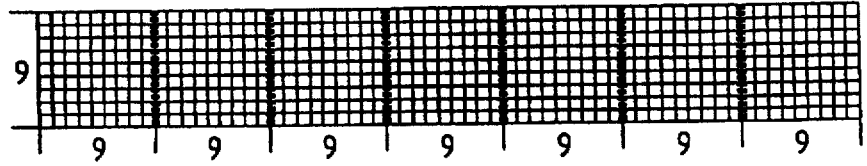

FIG. 5A

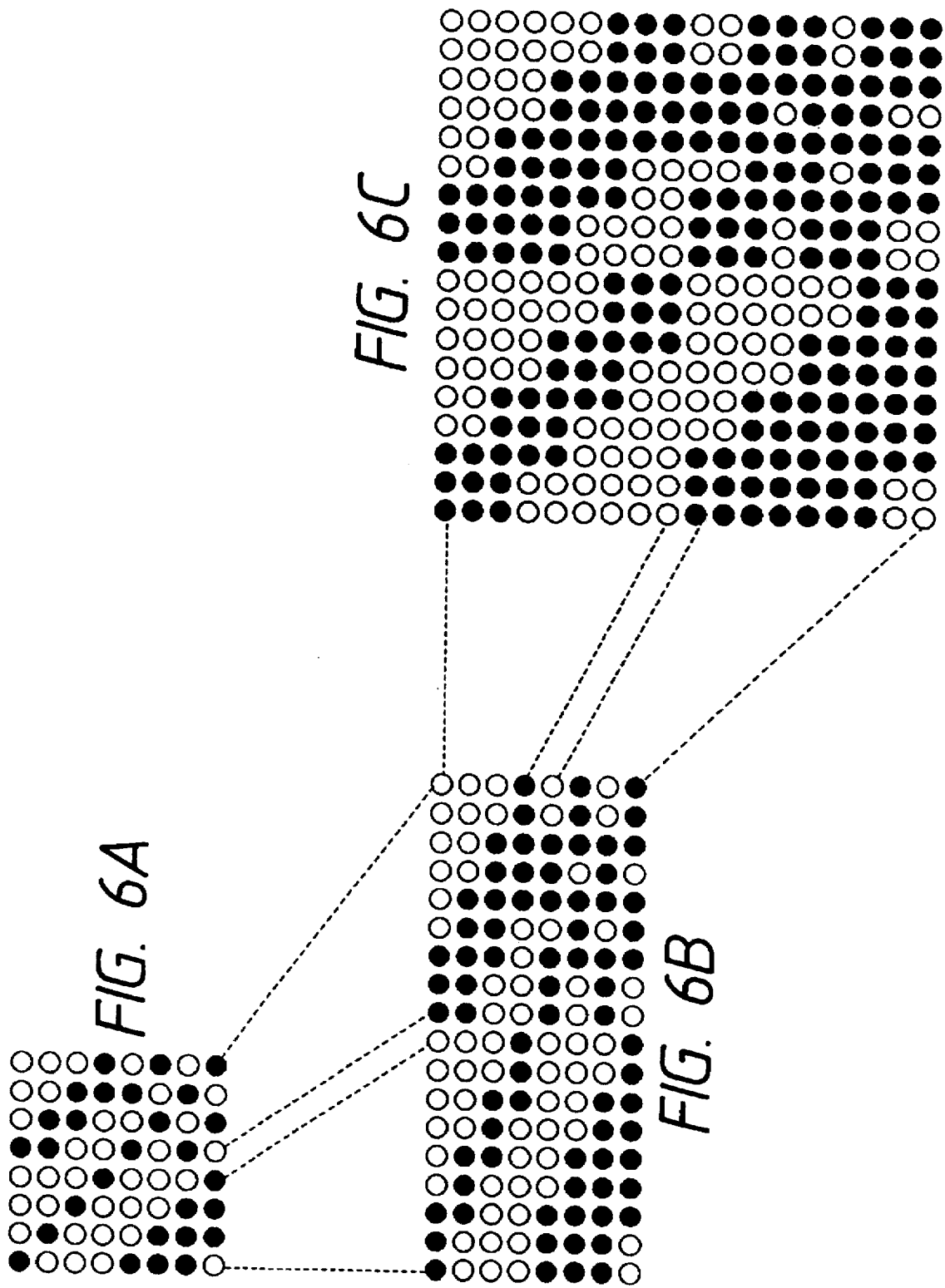

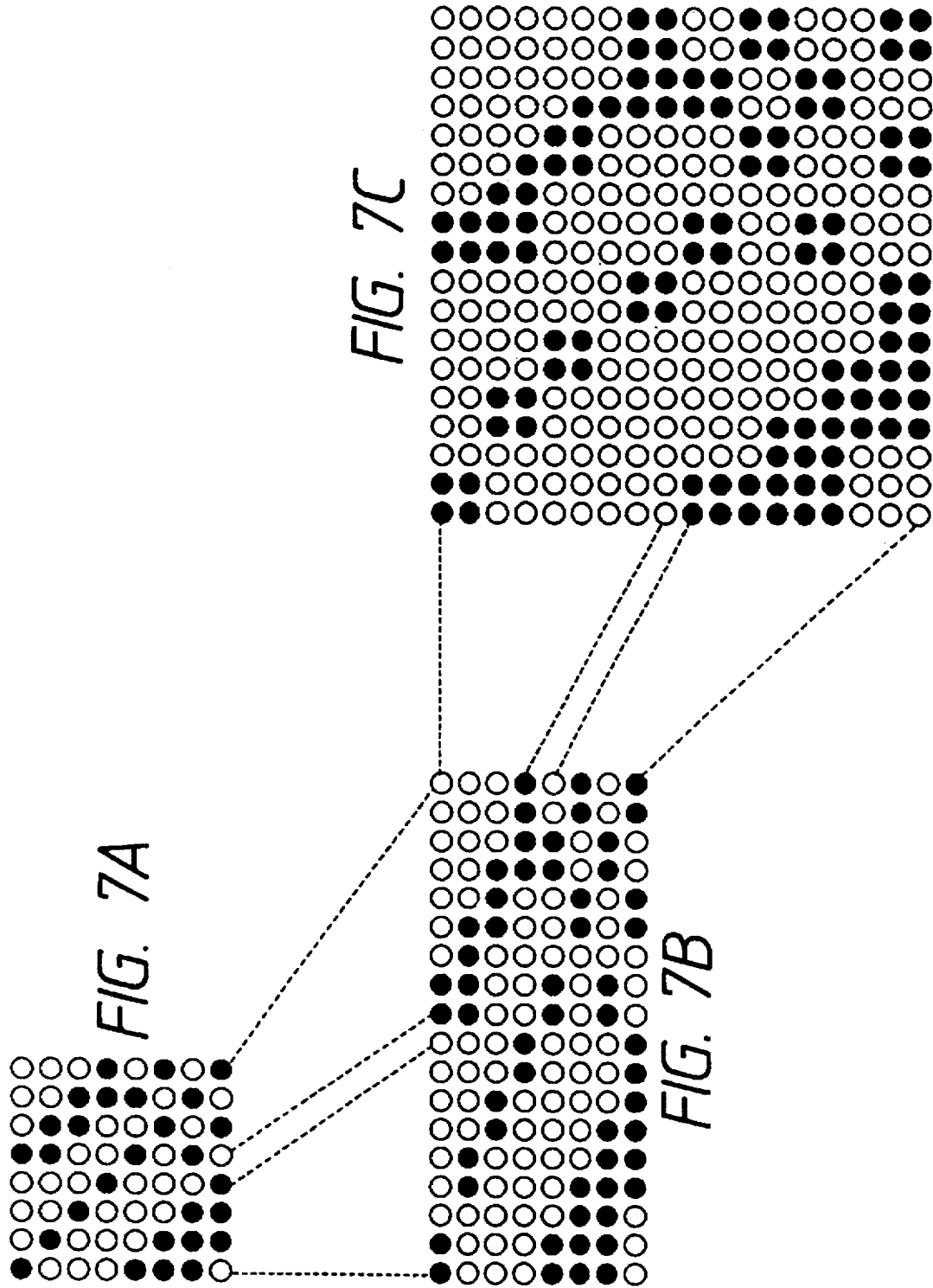

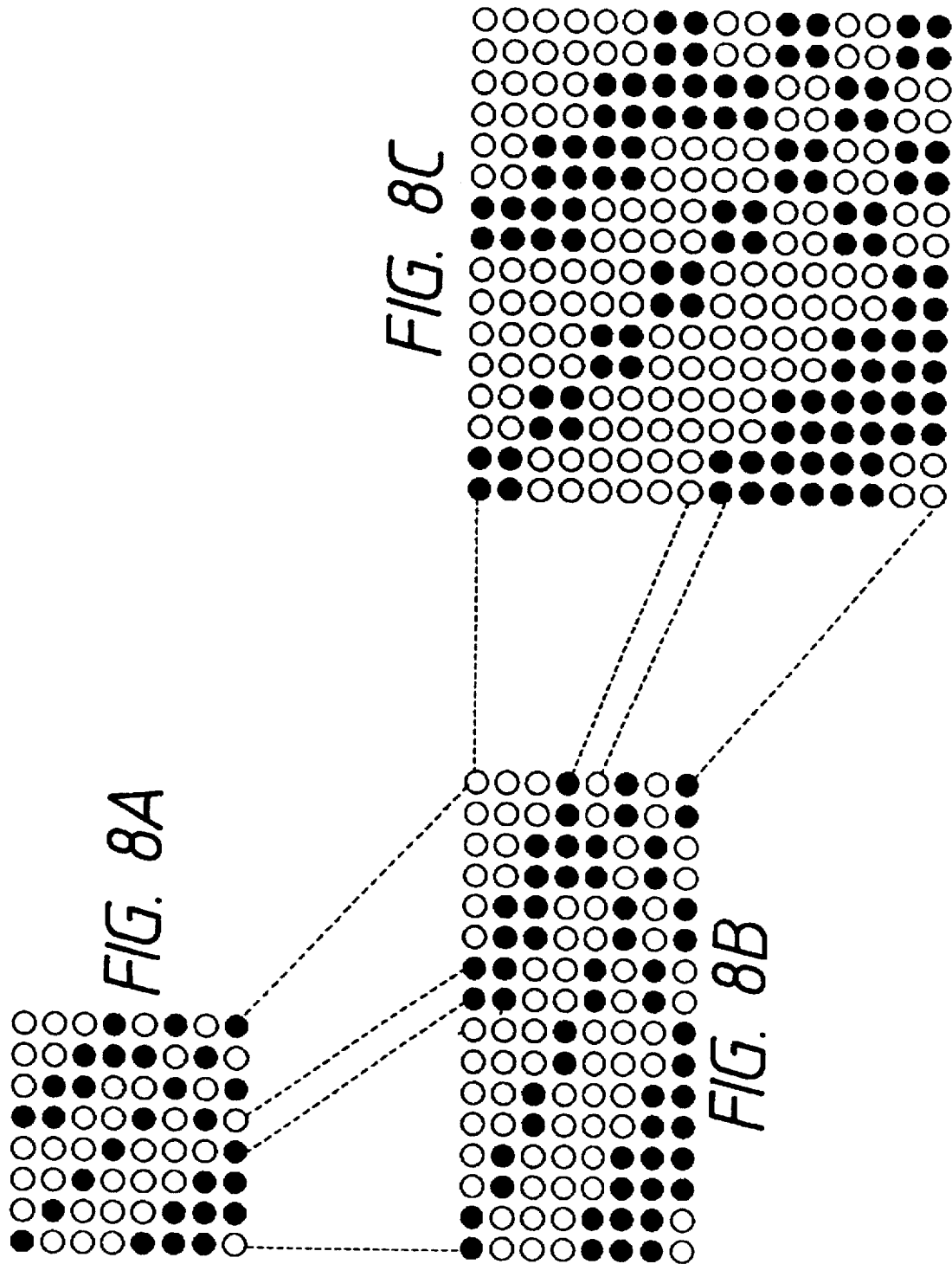

FIG. 11

|  | A | B | D |
|---|---|---|---|
| SIMPLE THINNING | 0 | 0 | 0 |
|  | 1 | 0 | 0 |
|  | 0 | 1 | 1 |
|  | 1 | 1 | 1 |
| LOGICAL SUM (OR) THINNING | 0 | 0 | 0 |
|  | 1 | 0 | 1 |
|  | 0 | 1 | 1 |
|  | 1 | 1 | 1 |
| LOGICAL PRODUCT (AND) THINNING | 0 | 0 | 0 |
|  | 1 | 0 | 0 |
|  | 0 | 1 | 0 |
|  | 1 | 1 | 1 |

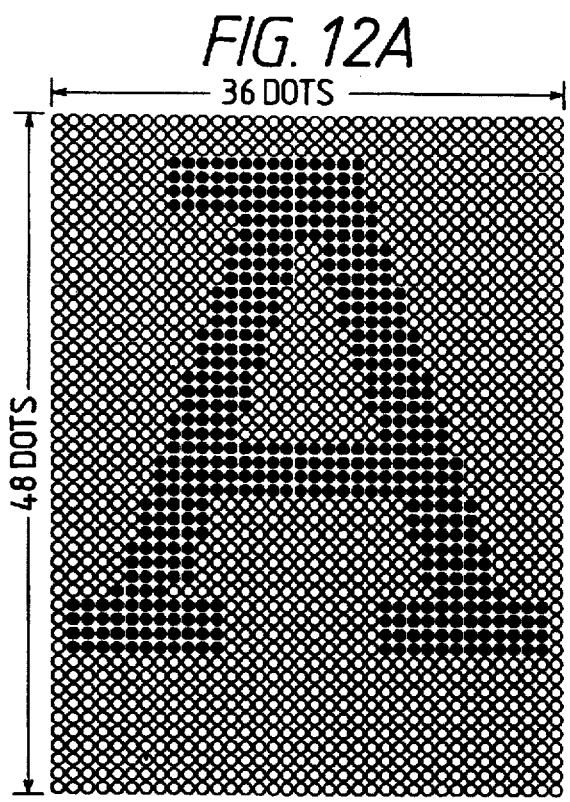
FIG. 12A — 36 DOTS × 48 DOTS
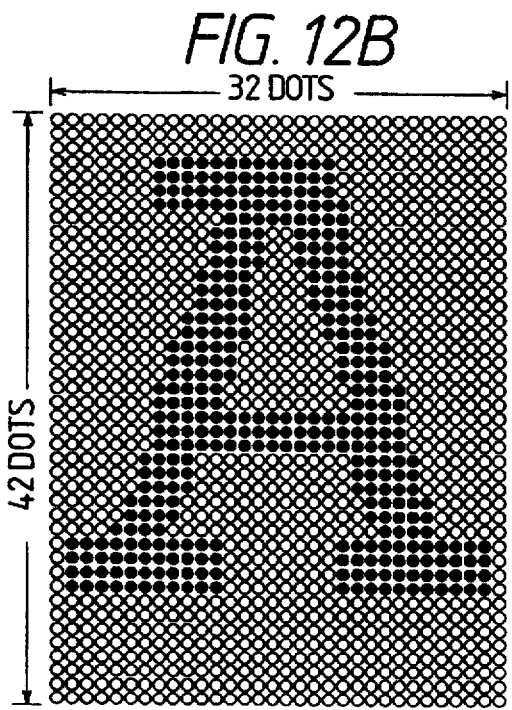
FIG. 12B — 32 DOTS × 42 DOTS
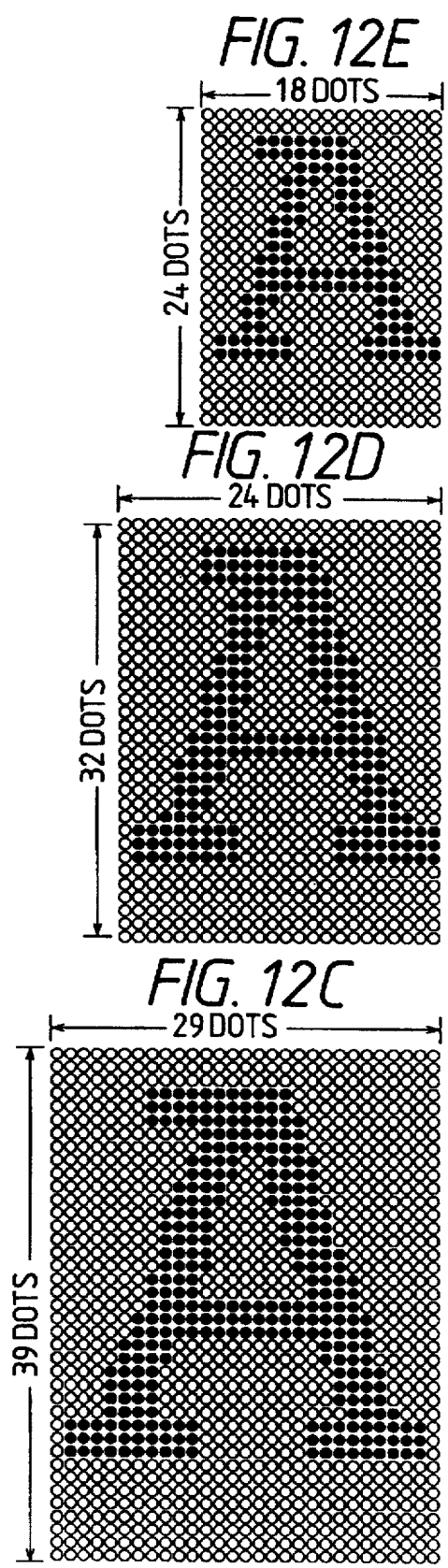
FIG. 12E — 18 DOTS × 24 DOTS
FIG. 12D — 24 DOTS × 32 DOTS
FIG. 12C — 29 DOTS × 39 DOTS

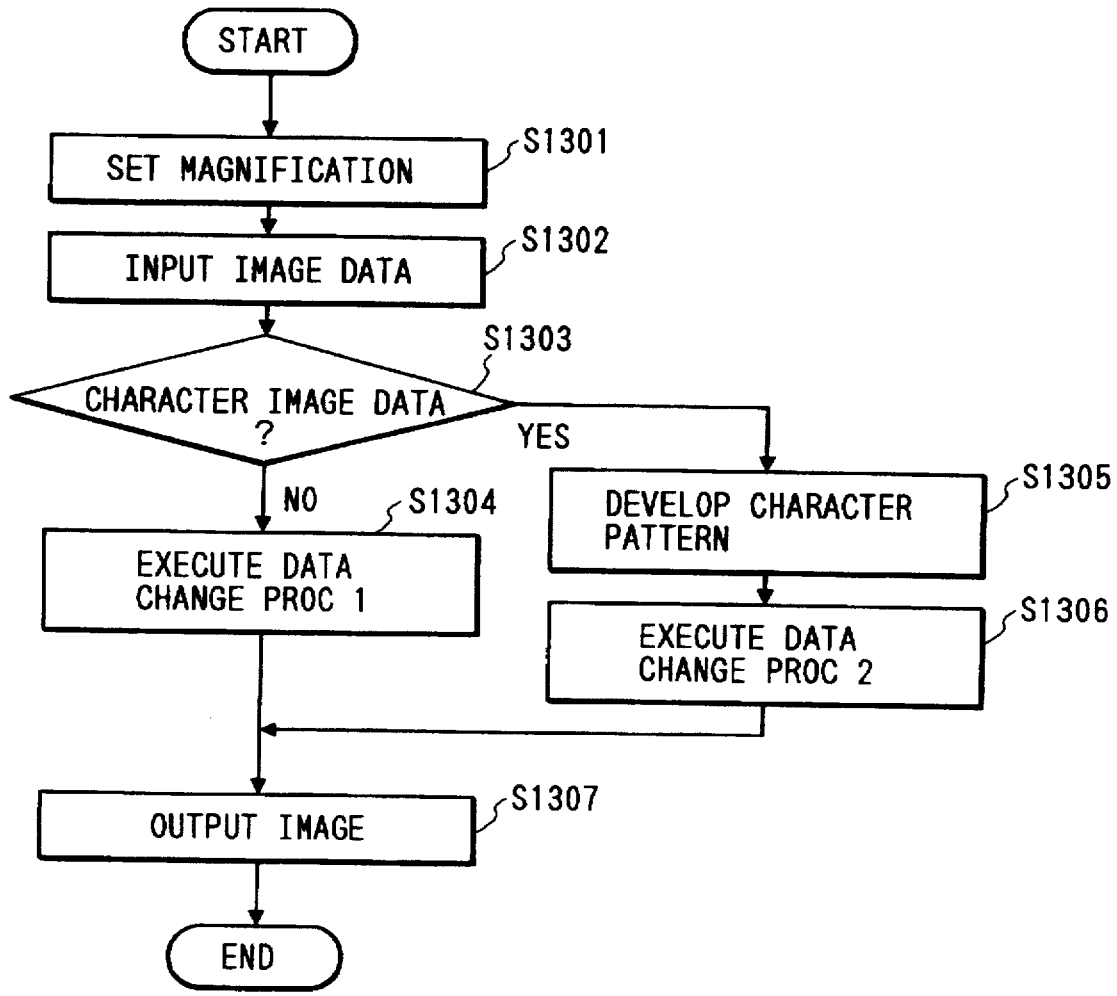

FIG. 15

| ORIGINAL IMAGE DATA | | OUTPUT IMAGE DATA | |
|---|---|---|---|
| MSB | LSB | MSB | LSB |
| 0 0 0 0 | | 0 0 0 0 0 0 0 0 | |
| 0 0 0 1 | | 0 0 0 0 0 0 1 1 | |
| 0 0 1 0 | | 0 0 0 0 1 1 0 0 | |
| 0 0 1 1 | | 0 0 0 0 1 1 1 1 | |
| 0 1 0 0 | | 0 0 1 1 0 0 0 0 | |
| 0 1 0 1 | | 0 0 1 1 0 0 1 1 | |
| 0 1 1 0 | | 0 0 1 1 1 1 0 0 | |
| 0 1 1 1 | | 0 0 1 1 1 1 1 1 | |
| 1 0 0 0 | | 1 1 0 0 0 0 0 0 | |
| 1 0 0 1 | | 1 1 0 0 0 0 1 1 | |
| 1 0 1 0 | | 1 1 0 0 1 1 0 0 | |
| 1 0 1 1 | | 1 1 0 0 1 1 1 1 | |
| 1 1 0 0 | | 1 1 1 1 0 0 0 0 | |
| 1 1 0 1 | | 1 1 1 1 0 0 1 1 | |
| 1 1 1 0 | | 1 1 1 1 1 1 0 0 | |
| 1 1 1 1 | | 1 1 1 1 1 1 1 1 | |

FIG. 16

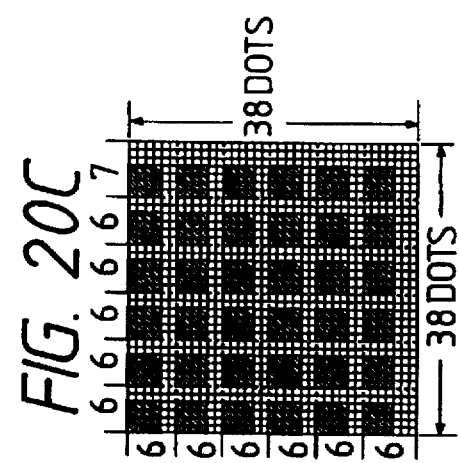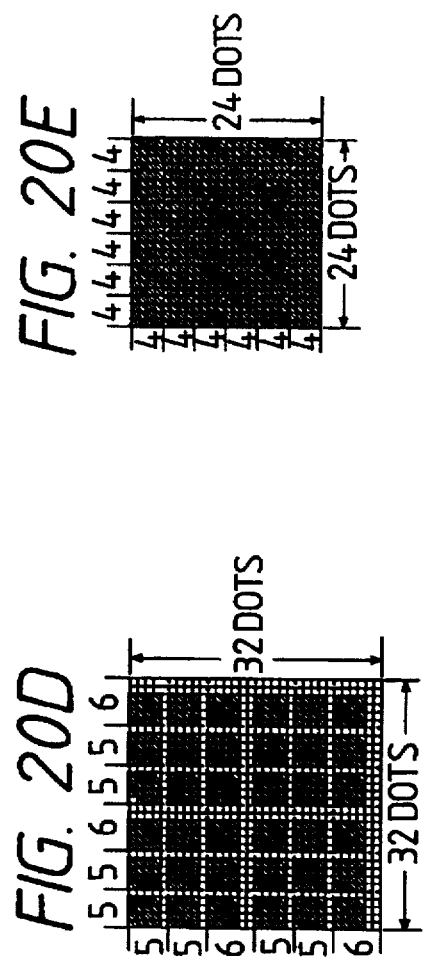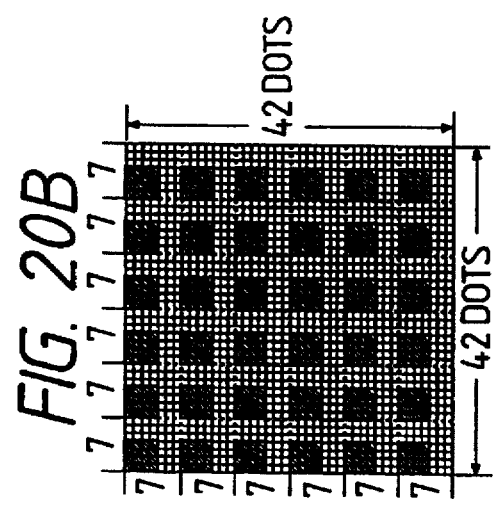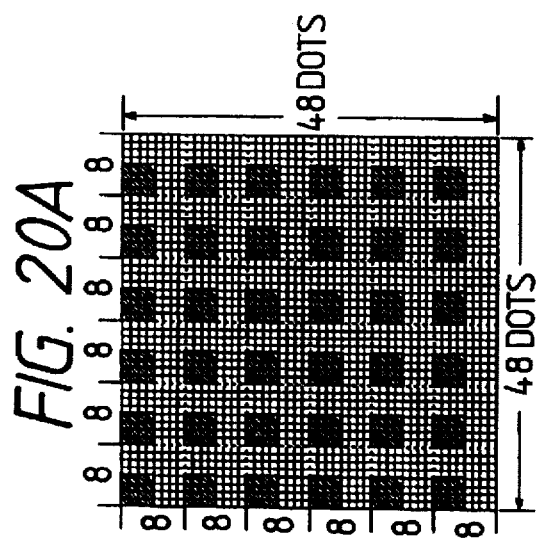
FIG. 20A  FIG. 20B  FIG. 20C  FIG. 20D  FIG. 20E

1

RESOLUTION CONVERSION METHOD AND APPARATUS

BACKGROUND OF THE INVENTION

1. Field of the Invention

The invention relates to data processing method and apparatus for converting a resolution and a magnification of input data and, more particularly, to data processing method and apparatus which are effective to an ink recording apparatus using a member to be conveyed such as paper, cloth, or special sheet as a member on which a liquid-like deposition material such as ink, ink which is obtained by setting the solid ink into a dissolved state, or toner which is obtained by dissolving fine particles was held and which can be applied to recording apparatuses such as copying apparatus, facsimile apparatus, and the like, a communicating apparatus, a business machine, a composite apparatus, a printer, and the like.

2. Related Background Art

Generally, in a recording apparatus which is connected to a host computer or the like and records and generates an image, image data comprising binary data which was binarized on the host computer side or character image data comprising character code information is received and generated as an image.

The image data falsely expresses a half tone image by a binary signal. A multivalue image signal is converted into a binary signal for deciding an on/off state of each dot which forms a pixel by using a dither matrix in which, for example, 16 threshold values are arranged in a two-dimensional plane of (4×4) by a dither method or the like. Due to this, even in case of the binary signal, a half tone image without a pseudo outline can be reconstructed.

As for character image data, a character code is sent to a recording apparatus and the recording apparatus develops a character pattern according to a character code in the apparatus and generates a character image. Generally, the character pattern has a pattern construction according to a resolution of the recording apparatus.

The resolution of the recording apparatus differs in dependence on a recording method. A resolution of the image data comprising the pseudo half tone image data which was processed by the host computer doesn't always coincide with the resolution of the recording apparatus. For example, when the resolution of the image data is lower than the resolution of the recording apparatus, an image which is generated is smaller than a desired size. Therefore, an enlargement converting process is needed.

That is, in order to commonly possess image data by a plurality of apparatuses having different resolutions, a resolution converting process to convert the image size (the number of pixels) is necessary.

A variable magnification process is needed in case of reducing a large image and outputting onto a small paper or in case of outputting a plurality of images onto one sheet of paper in a lump.

Hitherto, in case of executing the resolution converting process or variable magnification process of the binarized image, there are the following methods: namely, a method whereby the binary image is converted into the image of a predetermined number of pixels by similarly executing a thinning process or a repeating process by simply interpolating the pixels of an original image by using a thinning process, a repeating process, or a logical arithmetic operating process; a method whereby a plurality of matrix pattern tables each having a two-dimensional array for deciding a dot array state after conversion in accordance with an array state of the dots in a predetermined area of the original image are prepared in accordance with a conversion magnification and the binary image is converted into the image of a predetermined number of pixels by using a desired matrix pattern table of the two-dimensional array; a method whereby the average concentration of the original pixels (original pixel group) corresponding to the conversion pixels is presumed (requantization process) and the binary image is converted into the image of a predetermined number of pixels by again executing a binarization process by using a predetermined threshold value or a dither matrix; a method whereby the average concentration is presumed (requantization process) from signal states of the pixels in a predetermined area of the original image and a plurality of concentration pattern tables each for deciding an array of dots corresponding to the average concentration value are prepared in accordance with conversion magnifications and the binary image is converted into the image of a predetermined number of pixels by the concentration pattern; and the like.

However, since all of the data converting processes such as conventional resolution conversion [dpi (dots per inch) conversion] or variable magnification process needs to judge the states of not only the adjacent data but also the peripheral data, a memory capacity and a processing time cannot help increasing. There is a problem such that a high speed data process cannot be executed and a recording time cannot be reduced in association with it. Particularly, there is also an inconvenience such that the advantages of the on-demand ink jet recording cannot be effectively used.

Further, in the conventional recording apparatus having the function of the resolution converting process or variable magnification process of the binary image as mentioned above, in the case where both of the image data whose resolution differs from the resolution of the recording apparatus and the character image data in which a pattern is developed in accordance with the resolution of the recording apparatus mixedly exists, the resolution of the image and the resolution of the character image cannot be made coincide. There is consequently a problem such that the sizes of the output results of the image and the character image differ and a desired image cannot be obtained.

In the method for the resolution converting process and variable magnification process of the binary image mentioned above, the converting processing method using the matrix pattern table of a 2-dimensional array has a drawback such that a memory capacity which is occupied by the conversion matrix pattern table is very large.

On the other hand, in case of the method whereby the concentration of the original image is presumed and the array state of the dots of the conversion image is again decided, there are drawbacks such that the binary original image needs to be converted into the multivalue signal and the memory capacity which is occupied is large and a load of processes is large.

The other subjects of the present invention will be understood from the following detailed description of the summary and preferred embodiments.

SUMMARY OF THE INVENTION

It is a main object of the present invention to provide data processing method and apparatus in which, when data is received, the data can be sequentially converted into the data of a desired resolution in a manner such that the data is divided every predetermined number of bits of the reception data before, for example, a line buffer receives the data of an amount of one line or the like and in which a data process can be executed at a high speed without increasing a capacity of a buffer memory.

Another object of the invention is to provide a data processing method in which data to be processed can be reproduced at a high precision. Specifically speaking, it is an object of the invention to provide a data processing method which can assure a data preservation degree such that after data to be processed was once enlarged to data of a large number of bits, a desired process is executed.

Still another object of the invention is to provide data processing method and apparatus, in which even in case of an image in which both of an image and a character image having different resolutions mixedly exist, a high speed data process can be executed and an image can be generated at a desired size.

Further another object of the invention is to provide data processing method and apparatus in which in the case where the number of data to be processed variably changes, when different data processes (variable magnification and the like) are executed, a converting process of a further improved precision can be performed.

Further another object of the invention is to provide novel data processing method and apparatus for paying a large attention to the color or for improving a recording quality in either one of the recording conditions of a recording apparatus such as color recording, kind of recording medium, and further, printing mode such as reciprocating printing or one-direction printing, kind of overlap printing of print dots, and the like as new subjects which are not considered to be problems hitherto.

Specifically speaking, according to the invention, there is provided a data processing method which can process one-dimensional data of a resolution X to data of a desired resolution Y (X≠Y), wherein the one-dimensional data is divided into the data each comprising the number (A) of bits in a manner such that the ratio of [resolution X (dpi): resolution Y (dpi)] is equal to a ratio (A:B) of A and B which have a mutually prime relation, and the divided one-dimensional data of the number (A) of bits is previously converted into the one-dimensional data of the number (B) of bits by using a conversion pattern table to the bit number (B) according to the contents of the divided data of the predetermined bit number (A). According to the above method, the minimum unit in which a reproducibility of the data can be maintained is expanded, the data can be immediately converted according to the contents of the divided data of the bit number (A), a capacity of a temporary memory for the converting process can be reduced, and a high speed process can be accomplished. Although the ratio (A:B) has the mutually prime relation, even in case of using a conversion pattern table such that the image data can be converted every bit number (A) so as to set the integer ratio (A:B) having the common measure as X=αA and Y=αB, the process can be executed at a higher speed as compared with the conventional image process. In brief, in order to convert the one-dimensional data of the data number M into the data of a desired resolution, it is one of the important requirements for both of the resolution conversion and the magnification conversion to table convert the one-dimensional data of the number (M) of data every number (N) of data which has been predetermined in accordance with a desired resolution by previously using a resolution conversion table of the number (K:K≠N) of data to be converted in accordance with a desired resolution every desired resolution corresponding to the number (N:N is a common measure of M) of data that is smaller than the number (M) of data.

At least by executing such a converting process with respect to the data transfer direction irrespective of whether the recording means is of the serial type or the full line fixed type, the processing speed can be further raised. With respect to the direction (parallel arranging direction) different from the data transfer direction, there are advantages when repeating the same data or when similarly executing the conversion such as above-mentioned conversion table for converting the small number of bits (or the same table), respectively. By executing the variable magnification process after the converting process by the conversion table was executed, not only the variable magnified image in which a lack of data at the time of variable magnification is eliminated and a quality is maintained can be formed but also the variable magnification process corresponding to the contents of various kinds of data is not executed. Therefore, the processes can be efficiently executed without needing a memory capacity.

Further, since the character image data is generally supplied as code data, it is preferable to process without performing such a converting process because the processing speed can be relatively improved. A processing efficiency can be improved as a whole by performing the variable magnification process to both of the image data which was subjected to the one-dimensional data table conversion and the data which is obtained by performing the one-dimensional data conversion to the code data.

According to the invention, there is further provided a recording apparatus comprising: a first data processing unit as means for converting a resolution of image data and having a pattern table to previously convert into data of a number (B) of bits according to the contents of the divided data of a predetermined number (A) of bits in order to convert the image data into the one-dimensional data of the number (B) of bits every number (A) of bits so as to set to an integer ratio (A:B) as X=αA and Y=αB when α, A, and B assume integers for the one-dimensional image data whose resolution should be converted from a resolution (X) to a resolution (Y) (X≠Y) in the case where the number of conversion pixels regarding the resolution conversion ratio is equal to a value that is not integer times as large as one pixel; and a second processing unit for executing a conversion process by a repeating process of the same data in the case where the number of conversion pixels is equal to a value that is integer times as large as one pixel, wherein an image is recorded by using the data after completion of the resolution conversion. It is possible to realize the recording apparatus which can reduce the number of kinds of tables which are stored into a memory and can certainly execute an integer-time magnification process by limiting the use of the pattern table of the invention.

According to the invention, there is further provided another recording apparatus comprising: a first data processing unit having a pattern table to previously convert into data of the number (B) of bits according to the contents of the divided data of a predetermined number (A) of bits in order to convert the image data into the one-dimensional data of the number (B) of bits every number (A) of bits so as to set to an integer ratio (A:B) as X=αA and Y=αB when α, A, and B assume integers for the one-dimensional image data whose resolution should be converted from a resolution (X) to a resolution (Y) (X≠Y) in the case where the number of conversion pixels regarding a resolution conversion ratio is equal to a value that is not integer times as large as one pixel; and a second data processing unit to execute the conversion of β times by a repeating process of the same data of the number (D) of bits when the number (D:D=βA) of bits corresponds to the number (B) of bits when assuming that the one-dimensional image data whose resolution should be converted is set to D and β is set to an integer and for performing a data conversion process by using the pattern table after that. According to the above invention, the number of kinds of tables which are stored into a memory can be also reduced. Specifically speaking, if a one-dimensional conversion table for converting four bits into nine bits is prepared, it is sufficient to use a one-dimensional conversion table for enlarging the 2-bit data into the 4-bit data and for converting four bits into nine bits without having a table for converting two bits into nine bits.

The above and other objects and features, operations, and advantages of the present invention will become apparent from the following detailed description and the appended claims with reference to the accompanying drawings.

BRIEF DESCRIPTION OF THE DRAWINGS

FIG. 3 is a diagram showing an example of a flowchart for a magnification conversion process of image data;

FIGS. 4A to 4D are diagrams for explaining a data conversion processing method for outputting an image of 160 dpi by a recording apparatus of an image of 360 dpi at an equal magnification;

FIGS. 5A and 5B are diagrams showing examples of conversion pattern tables for converting four pixels into nine pixels;

FIGS. 6A to 6C are diagrams showing an example of image data which is obtained by converting an original image of 160 dpi by using a conversion pattern table;

FIGS. 7A to 7C are diagrams showing another example of image data which is obtained by converting an original image of 160 dpi by using a conversion pattern table;

FIGS. 8A to 8C are diagrams showing an example of image data which is obtained by converting an original image of 180 dpi by using a conversion pattern table;

FIG. 11 is a diagram showing signal values which were subjected to logical arithmetic operation processes;

FIGS. 12A to 12E are diagrams showing examples of images which were subjected to magnification conversion processes by thinning out image data;

FIG. 13 is a diagram showing an example of another flowchart for the magnification conversion process of image data;

FIG. 15 is a diagram showing an example of a conversion pattern table for converting four pixels into eight pixels;

FIG. 16 is a diagram showing an example of a conversion pattern table for converting four pixels into seven pixels;

FIGS. 20A to 20E are diagrams showing variable magnification processing methods of 180 dpi;

DETAILED DESCRIPTION OF THE PREFERRED EMBODIMENTS (Embodiment 1)

An outline of an image signal process according to an embodiment of the invention will be first described.

Figure 21:
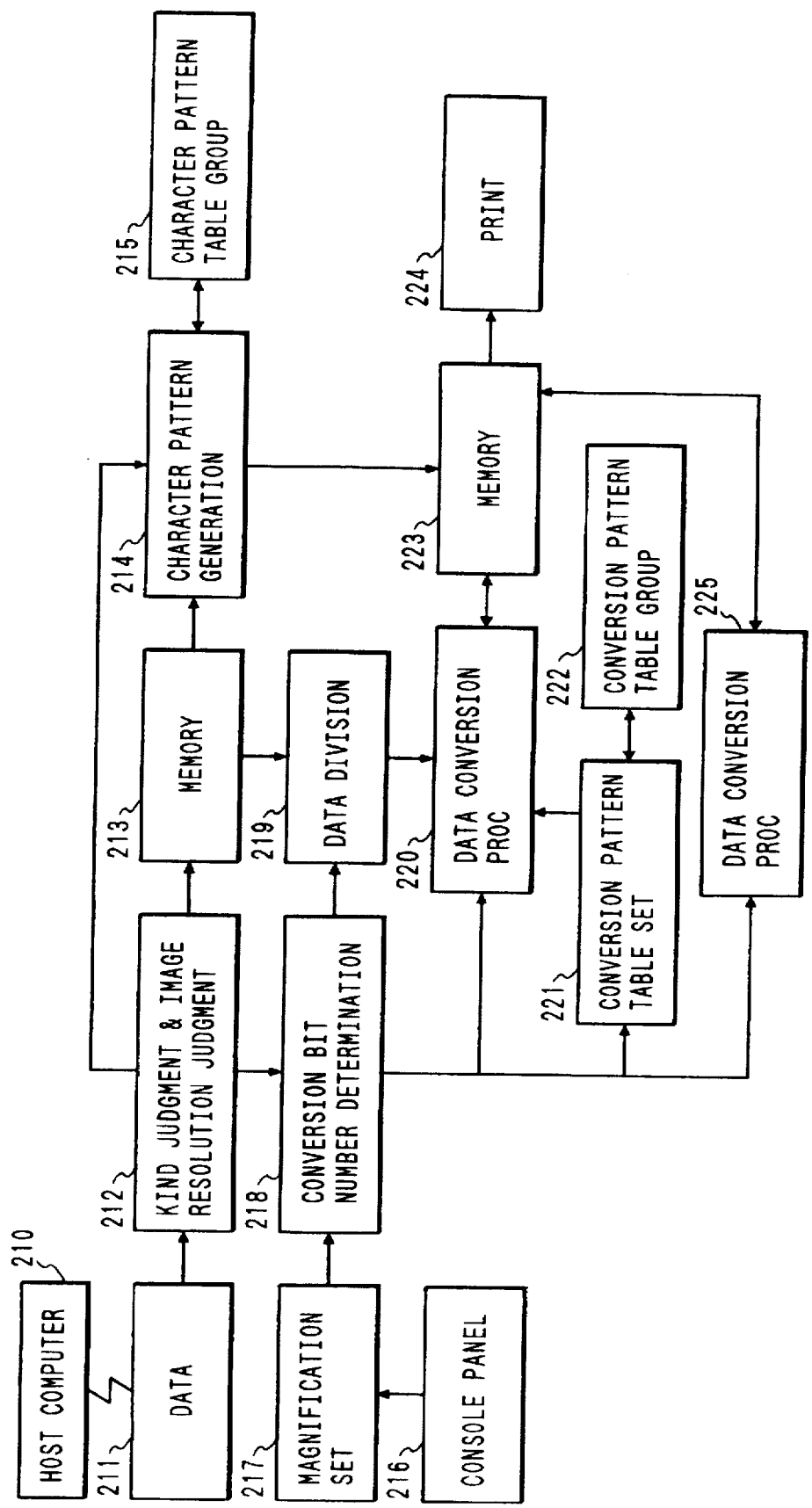
FIG. 21 is a block diagram showing an outline of a data process in the embodiment of the invention.

FIG. 21 is an explanatory diagram showing an outline of a data converting process in the embodiment of the invention. In FIG. 21, image data 211 which is sent from a host computer 210 or the like is received. In this instance, as image data which is sent from the host computer 210 or the like, character image data comprising character code information and image data comprising binarized bit map information can mixedly exist. In a block 212, the character image data and the image data can be easily judged in accordance with the format of a control command included in the image data and the contents of a signal. Further, in case of the image data, an image resolution can be also judged.

The received image data is temporarily stored into a memory 213.

When the data is the image data, the number of conversion bits is decided in a block 218 by magnification information from a magnification setting unit 217 and resolution information of the image in accordance with an image output magnification designated by a console panel 216. A resolution of image data is first converted into the resolution of the recording apparatus. For example, now assuming that the resolution of the recording apparatus is set to P (dpi) and the resolution of the image data is set to I (dpi), in order to output the image at an equal magnification, it is necessary to convert one pixel into P/I pixel and (n) bits of the image data are converted into [n×(P/I)] bits.

The image data in the memory 213 is divided into the data of a predetermined number of pixels (n bits) by a data division unit 219. A data converting process is executed by a data conversion processing unit 220 by using a conversion pattern table 222. The converted data is stored into a memory 223. The memory 223 can be also commonly used as a memory which is necessary for the data converting process.

The conversion pattern table is a table to decide a length of one-dimensional data to be converted in accordance with the magnification and (n) bits are converted into (n') bits [n'=n×(P/I)]. The conversion pattern table is selected from the conversion pattern table group 222 in accordance with conversion bit number decision information. The optimum conversion pattern table is set in a block 221.

In the case where the data is the character image data, a character pattern corresponding to the character code information in the memory 213 is selected from a character pattern table group 215. The character pattern is developed by a character pattern generation unit 214 and is stored into the memory 223. The character image pattern is a pattern which was determined by using the resolution of the recording apparatus. At this time point, in the image data in the memory 223, both of the character image data and the image data have been converted into the bit map information of the resolution of the recording apparatus.

In the process to convert into the actual magnification designated by the console panel 216, the data in the memory 223 is converted by a data conversion process 225 for the image data which was converted to the data of the resolution of the recording apparatus.

The data conversion process 225 converts the data by using a thinning process by the conversion bit number decision signal. In the case where the magnification is set to a reduction magnification of α times (α<1), a process to thin out (n') bits into (α×n') bits is executed.

In the above construction, although the number of conversion bits has been decided through the console panel and the magnification set unit, in case of an apparatus which can output an image at only an equal magnification, the number Of conversion bits can be also automatically decided in the apparatus on the basis of the ratio between the discrimination result of the resolution of a control command signal included in the received image data and the resolution of the recording apparatus. Further, the variable magnification information can be also included in the control command signal. By the above construction, even in an image in which the image data and character image data of different resolutions mixedly exist, the data can be variably magnified and an image of a desired size can be obtained.

The invention will now be described in detail hereinbelow with reference to the drawings.

Figure 1:
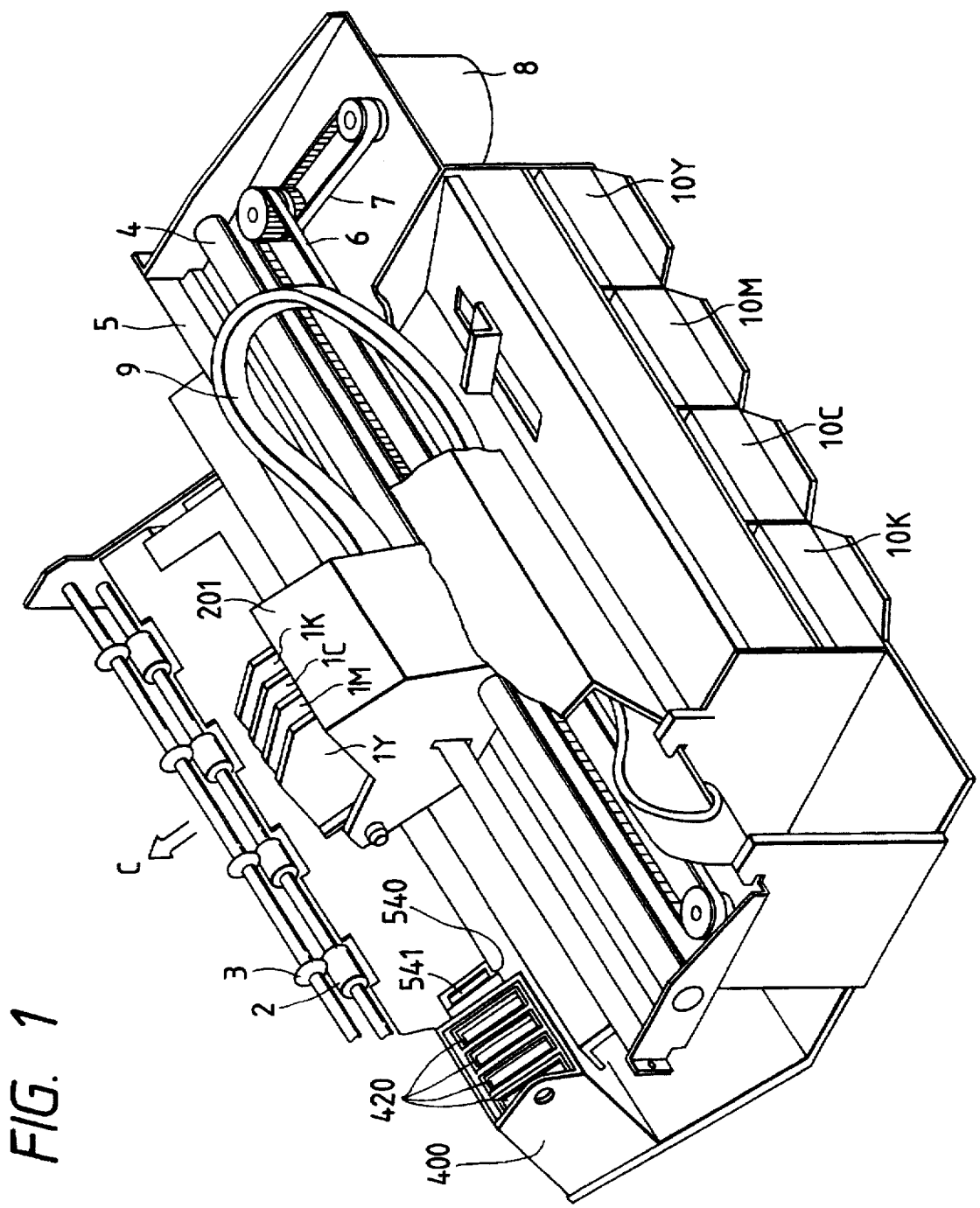
FIG. 1 is a constructional diagram of a main section of a color ink jet recording apparatus of the serial scan type according to an embodiment of the invention.

FIG. 1 is a perspective view showing a construction of a main section of a color ink jet recording apparatus of the serial scan type in the embodiment of the invention.

A recording head 1Y to emit the color ink of yellow, a recording head 1M to emit the color ink of magenta, a recording head 1C to emit the color ink of cyan, and a recording head 1K to emit the color ink of black are arranged in a carriage 201 at predetermined distances. A material to be recorded (also referred to as a recording material) made by a paper, a plastics thin plate, or the like is sandwiched by paper discharge rollers 2 and 3 through a conveying roller (not shown) and is sent in the direction indicated by an arrow C in association with the driving of a conveying motor (not shown).

The carriage 201 is guided and supported by a guide shaft 4 and an encoder 5. The carriage 201 is reciprocated along the guide shaft 4 by the driving of a carriage motor 8 through driving belts 6 and 7.

A plurality of emission ports are formed on the surface (emission port forming surface) of the recording head 1 which faces the recording material. A heat generation element (electro/thermal energy converting member) to generate a thermal energy for emission of the ink is provided in each emission port (liquid channel).

The heat generation element is driven on the basis of a recording signal in accordance with a read timing of the encoder 5 and the ink liquids are emitted and deposited onto the recording material in accordance with the order of black, cyan, magenta, and yellow, so that an image can be formed.

A recovery unit 400 having a cap portion 420 with four caps, which will be explained hereinlater, is arranged at the home position of the carriage 201 which is selected to a position out of the recording area. When the recording is not performed, the carriage 201 is moved to the home position and the emission port forming surface of each of the corresponding recording heads 1 is closed by each cap of the cap portion 420, thereby preventing a choke of the emission port due to the adhesion of the ink which is caused by the evaporation of an ink solvent, the deposition of a foreign matter such as dust, or the like. A blade 540 and a wiping member 541 are arranged at the neighboring positions of the cap portion 420 and are used to clean the emission port forming surface of the recording head 1. The ink is supplied to the recording head 1 from an ink tank 10 through an ink tube 9 via a subtank (not shown) on the carriage 201.

The recording apparatus in the embodiment can record an image at a resolution of 360 dpi. The recording head has 64 emission ports and can record the data as much as 64 dot lines by one scan. A recording width is set to a value such that an image can be recorded onto a paper of the longitudinal size of up to A4 size. Data of 2880 dots, namely, a width of 360 bytes per dot line can be recorded.

Figure 2:
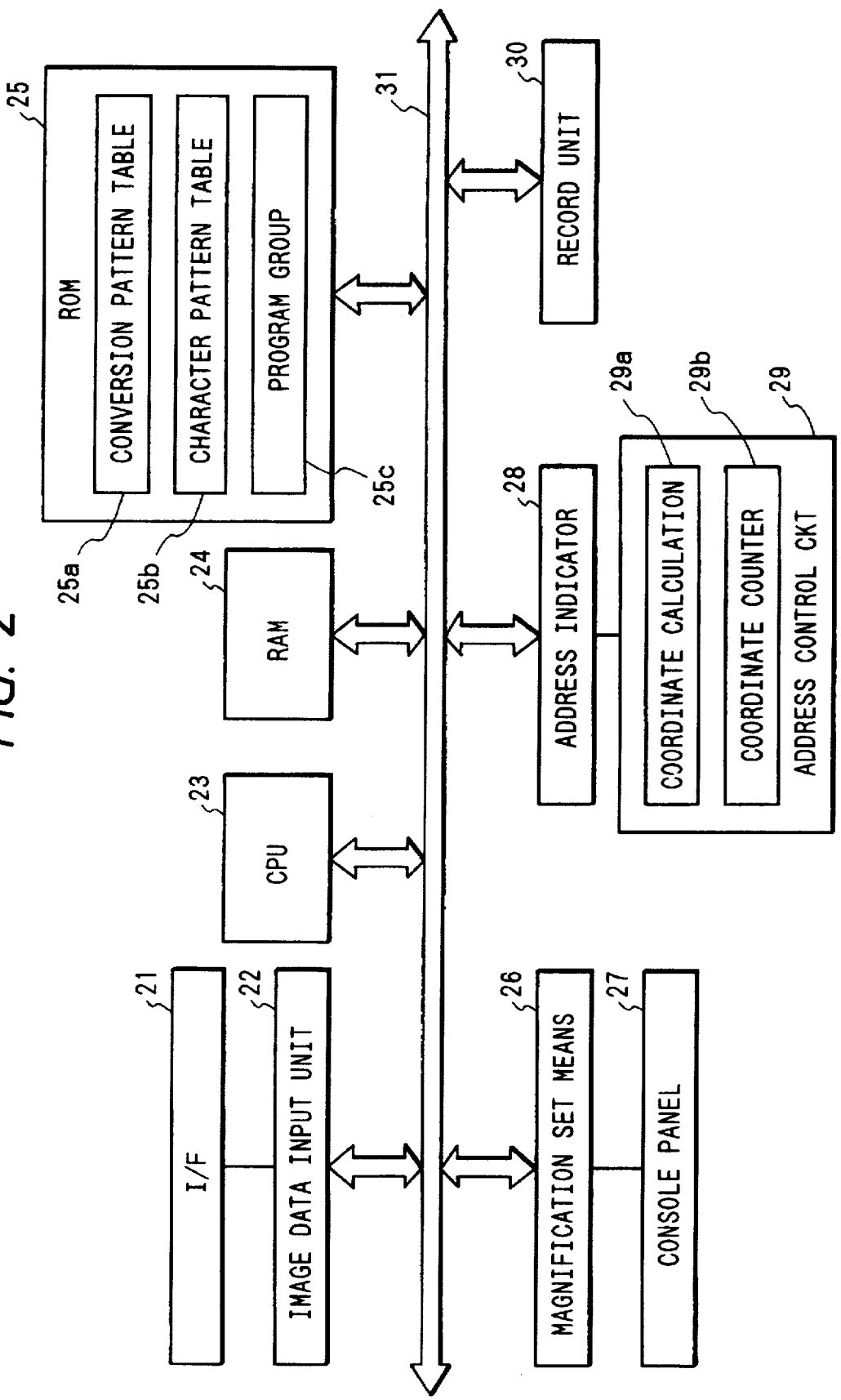
FIG. 2 is a block diagram showing a construction of the recording apparatus in the embodiment of the invention.

FIG. 2 is a block diagram showing a construction in the apparatus of the embodiment of the invention.

Reference numeral 22 denotes a image data input unit which receives the image data from a host computer or the like through an interface 21. Reference numeral 23 denotes a CPU to control the whole apparatus in accordance with various kinds of programs in an ROM 25. Reference numeral 24 denotes an RAM which is used as a work area of various kinds of programs in the ROM 25, a temporary refuge area at the time of error process, and further a temporary memory area of the image data. The temporary memory area of the image data has a capacity of 64 kbytes for input and a capacity of three scan records (3×64×360 bytes/color) for output. A control program, an error processing program, a program to execute the process of the image data in accordance with flowcharts, which will be explained hereinlater, and the like have been stored in the ROM 25. Reference numeral 25a denotes a conversion pattern table which is used for a data conversion process, which will be explained hereinbelow, 25b a character pattern table to develop the character pattern in accordance with the character code of the character image data; 25c a program group in which various kinds of programs have been stored; 26 means for setting a magnification of an image by designating from a console panel 27; 28 an address indicator to indicate addresses in the RAM and ROM in accordance with information from an address control circuit 29; 30 a record unit shown in FIG. 1 to record and output the image; and 31 a bus line of the data.

The following magnifications can be set in the apparatus: namely, an equal magnification; a ⅞ reduction magnification in case of outputting the image of the A4 size as an image of the B5 size; a ⅘ reduction magnification in case of outputting the image of the B4 size as an image of the A4 size; a ⅔ reduction magnification in case of outputting the image of the A3 size as an image of the A4 size; and a ½ reduction magnification in case of outputting the image of the B4 size as an image of the B5 size.

A magnification conversion process in the embodiment will now be described.

FIG. 3 is a flowchart for a magnification conversion process in the embodiment. In step S301, a magnification is set. In step S302, image data is input. In step S303, a check is made to see if the input image data is the character image data comprising the character code information or the image data comprising the bit map information. The character image data and the image data can be easily judged by, for example, a control command signal which is sent before the image data. In step S303, when it is judged that the input image data is the character image data, the corresponding character pattern is developed in step S306. In step S307, the data conversion process 2 (225 in FIG. 21) is executed in accordance with the designated magnification. When it is judged in step S303 that the input image data is the image data, a check is made in step S304 to see if the image data is the data of a predetermined resolution. In case of the recording apparatus of the embodiment, since the resolution is equal to 360 dpi, when the resolution is other than that, step S305 follows and the data conversion process 1 (220 in FIG. 21) is executed.

In case of the data of a predetermined resolution, namely, when the resolution of the data is equal to 360 dpi, or in case of the image data after completion of the conversion into the data of the predetermined resolution by the data conversion process 1, such image data is further subjected to the data conversion process 2 in accordance with the designated magnification.

The data conversion process 1 in step S305 will now be described. The process for converting the image data of 160 dpi into the image data of 360 dpi, which is not integer times as large as 160 dpi, and for outputting the image at an equal magnification will now be described.

In case of the image of 160 dpi, an interval between pixels is equal to about 158.8 μm. On the other hand, in case of the image of 360 dpi, an interval between pixels is equal to about 70.6 μm. That is, in order to reconstruct the image of the same size, in case of the image of 360 dpi, a larger number of pixels are needed as compared with the image of 160 dpi and it is necessary to convert the image data by high density information.

Therefore, when the image data of 160 dpi is output as it is by the recording apparatus of 360 dpi, the size of image is reduced into 160/360=4/9 and is smaller than the target image size. Therefore, in order to output the image of the target size, an enlargement conversion process for converting four pixels into nine pixels is needed.

FIGS. 4A to 4D are explanatory diagrams showing conversion processing methods for outputting the image of 160 dpi by the recording apparatus of 360 dpi at an equal magnification. The image data which is received by the recording apparatus corresponds to the signal of one pixel and one bit.

First, the image data in the horizontal direction (hereinafter, referred to as a main-scan direction) is divided every four bits (FIG. 4A). Subsequently, each data consisting of four bits is converted into the data of nine bits in accordance with a conversion pattern table, which will be explained hereinlater (FIG. 4B).

After completion of the conversion with respect to the image data of four lines (FIG. 4C), each data of four bits is also similarly converted into the data of nine bits with regard to the vertical direction (hereinafter, referred to as a sub-scan direction) (FIG. 4D).

By repetitively executing the above processes with respect to all of the image data, the image of the equal magnification can be output by the recording apparatus of 360 dpi.

Figure 5A:
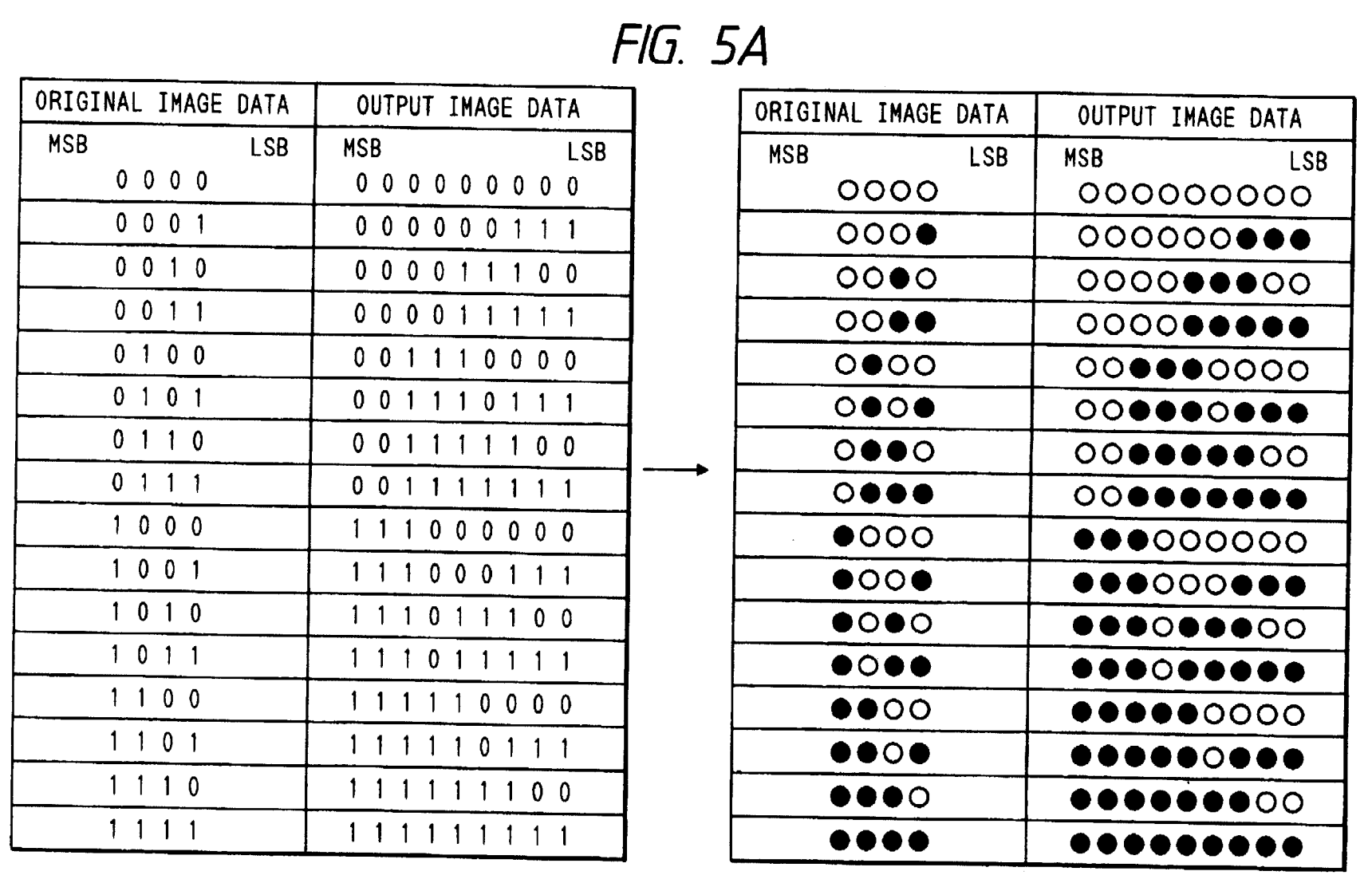
Figure 5B:
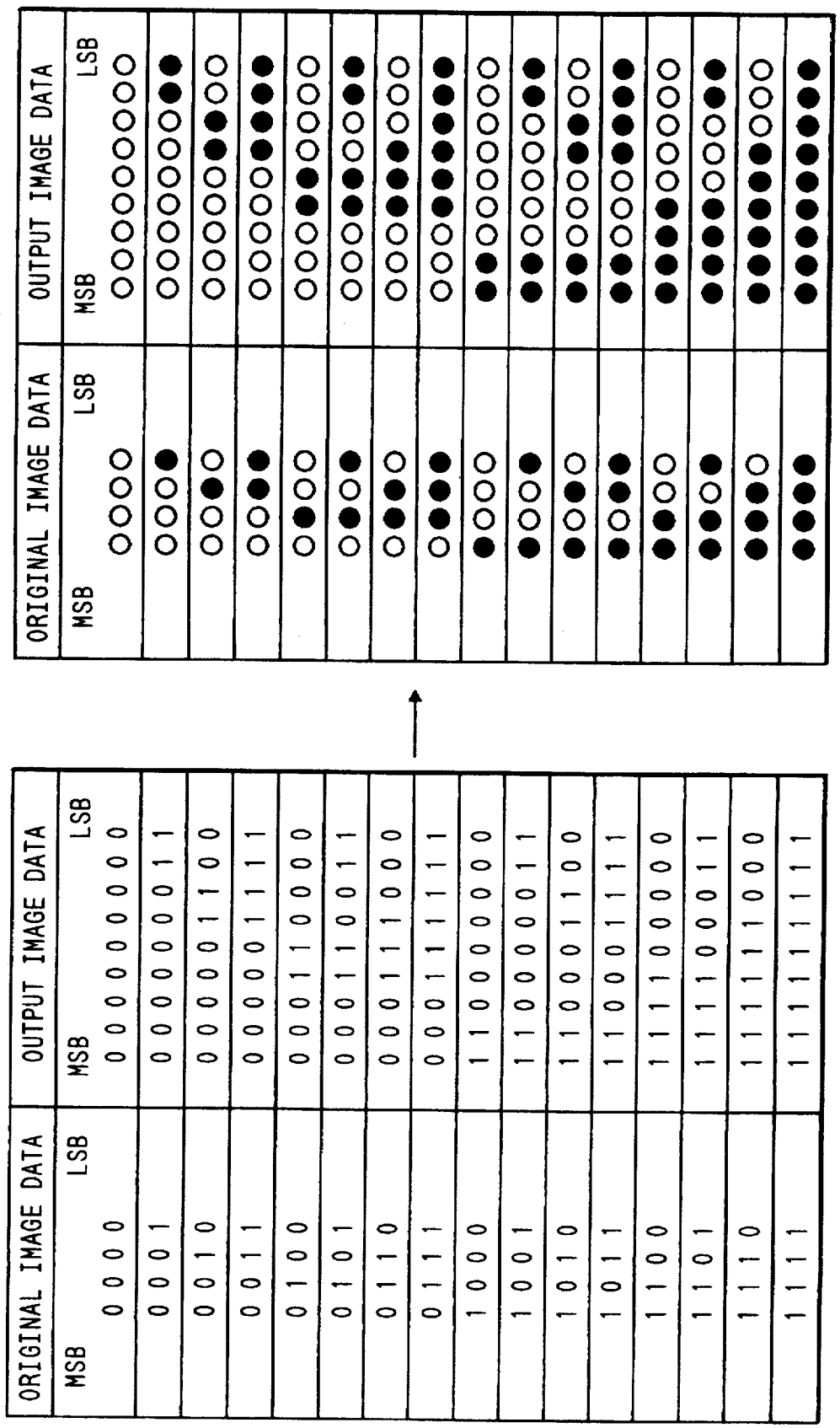

FIGS. 5A and 5B show conversion pattern tables. The foregoing conversion from the 4-bit data into the 9-bit data is performed by using the conversion pattern table.

FIGS. 6A to 6C show images which are obtained by executing the data conversion process by using the conversion pattern table of FIG. 5A.

FIG. 6A shows an original image pattern of 160 dpi. FIG. 6B shows an image which is obtained by enlarging the image data in the main-scan direction of FIG. 6A. FIG. 6C shows an image which is obtained by enlarging the data in the sub-scan direction in FIG. 6B.

In case of a non-integer magnification conversion process for converting from four pixels into nine pixels, the ratio between the black pixels and the white pixels after conversion doesn't coincide with that before conversion.

In case of using the ink jet recording method as a recording method as in the embodiment, a diameter of dot corresponding to one pixel is increased due to a blur of the ink and a dot covering ratio increases, so that there is a case where the image becomes dark when the ratio of the black pixels is high.

FIGS. 7A to 7C show images which are obtained by executing the data conversion process by using the conversion pattern table of FIG. 5B. The conversion pattern table of FIG. 5B is set so that the ratio of white pixels is larger than that of black pixels.

FIG. 7A shows an original image pattern of 160 dpi. FIG. 7B shows an image which is obtained by enlarging the data in the main-scan direction in FIG. 7A. FIG. 7C shows an image which is obtained by enlarging the data in the sub-scan direction in FIG. 7B.

As compared with the image in FIGS. 6A to 6C which were converted by using the conversion table in FIG. 5A, the image is brighter because the ratio of black pixels is small.

Particularly, in case of a color image, when a covering ratio of black dots is large, the saturation deteriorates, the image quality deteriorates, and an ink amount per unit area is large. Therefore, a dot diameter is easily increased due to the blur of the ink, so that a more preferable image is obtained by using the conversion table of FIG. 5B for a black image portion or a mixture color image portion.

As mentioned above, in each of the conversion pattern tables, only the number of conversion pixels is specified and the conversion contents are not limited to those shown in the embodiment. It is also possible to prepare a plurality of conversion pattern table and to switch and use a proper table in accordance with the image or color. Further, a degree of blur of the ink also differs in dependence on the kind of recording material. The conversion pattern table can be also switched and used in accordance with a medium such that the ink blurs to a certain degree like an exclusive-use paper in which an absorption property of the ink is raised by providing an ink absorbing layer or by increasing the number of gaps or a medium such that the ink hardly blurs like a transparency film having an ink acceptable layer.

In case of recording an image, there are various kinds of cases where the recording control is executed such as case where an image is formed by one scan, case where an image is formed divisionally by a plurality of number of times of recording scans in order to raise a picture quality, case where a special color is emphasized and an image is recorded, and the like. The conversion pattern table, however, can be also varied in accordance with a recording control method of the apparatus.

In the above method, the conversion process has been performed by using the conversion pattern tables in both of the main-scan direction and the sub-scan direction. However, it is also possible to construct in a manner such that the conversion process is executed in either one of the main-scan direction and the sub-scan direction by using the conversion pattern table and, with respect to the other remaining direction, by repeating the previous information by the necessary number of times or by interpolating new pattern information by the conversion pattern information before and after by logical arithmetic operating means by OR process, AND process, etc., the converted image data can be also obtained. For instance, the image data is converted in the main-scan direction by using the conversion pattern table. With respect to the sub-scan direction, the data after completion of the conversion process in the main-scan direction is repeated by the necessary number of times. Or, on the basis of the data after completion of the conversion process in the main-scan direction before and after, new pattern information is obtained by the logic arithmetic operating means such as OR process, AND process, etc. and the data of the necessary portion can be also interpolated. The conversion pattern table can be also used in only the sub-scan direction. It is sufficient to selectively use more efficient means in accordance with the format of data which is sent.

The case where the image data of 180 dpi is converted into the image data of 360 dpi which is integer times as large as 180 dpi and an image is output at an equal magnification will now be described.

In case of the image of 180 dpi, an interval between pixels is equal to about 141.1 µm. In case of the image of 360 dpi, an interval between pixels is equal to about 70.6 µm. That is, in order to reconstruct the image of the same size, in case of the image of 360 dpi, a larger number of pixels are necessary as compared with the image of 180 dpi and it is necessary to convert the image data by high density information.

When the image data of 180 dpi is output as it is by the recording apparatus of 360 dpi, the size of image is reduced into 180/360=½ and is smaller than the target image size. It is, therefore, necessary to execute the enlargement conversion process for converting four pixels into eight pixels in order to output the image of the target size.

FIGS. 8A to 8C show images which are obtained by executing the data conversion process by using the conversion pattern table of FIG. 15.

FIG. 8A shows an original image pattern of 180 dpi. FIG. 8B shows an image which is obtained by enlarging two times the data in the main-scan direction of FIG. 8A from four pixels to eight pixels. FIG. 8C shows an image which is obtained by similarly enlarging two times the data in the sub-scan direction in FIG. 8B from four pixels to eight pixels. In case of the magnification that is integer times as large as the magnification (n), it is sufficient to convert one pixel into (n×n) pixels by repeating the corresponding pixel information (n) times in both of the main-scan direction and the sub-scan direction. Therefore, the conversion process can be easily executed without using any conversion pattern table.

The present system is not limited to the image data of 160 dpi or 180 dpi. By preparing a plurality of conversion tables corresponding to various kinds of resolutions, the invention can cope with image data of various resolutions.

For the image data of a lower resolution such as 80 dpi, 90 dpi, or the like, the conversion process for converting from 80 dpi into 160 dpi or the conversion process for converting from 90 dpi into 180 dpi is executed by a processing method similar to the conversion process for converting from 180 dpi into 360 dpi and, after that, the conversion process from 160 dpi to 360 dpi or the conversion process from 180 dpi to 360 dpi as mentioned above can be also executed.

The data conversion process 2 in step S307 in FIG. 3 will now be described. In the data conversion process 2, by thinning out the pixels of the image data, an image of a predetermined magnification is produced.

FIGS. 9A to 9D show thinning positions according to the variable magnifications.

Figure 9A:
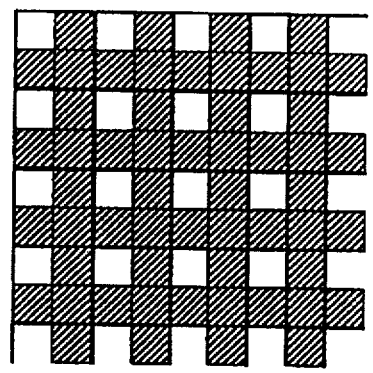
FIGS. 9A to 9D are diagrams showing the positions of thinning pixels at each magnification in a magnification conversion process by thinning out image data.
Figure 9B:
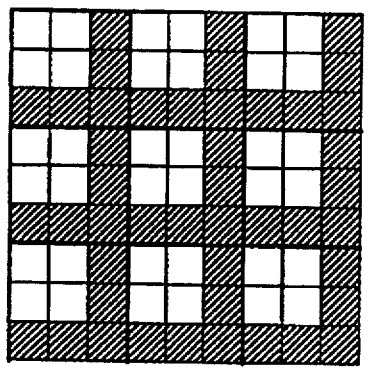
Figure 9C:
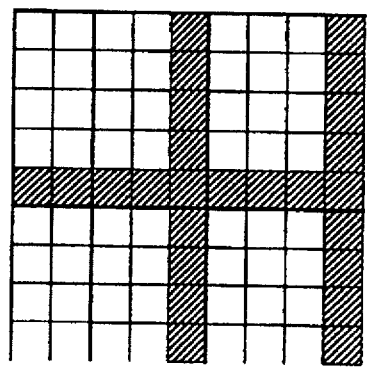
Figure 9D:
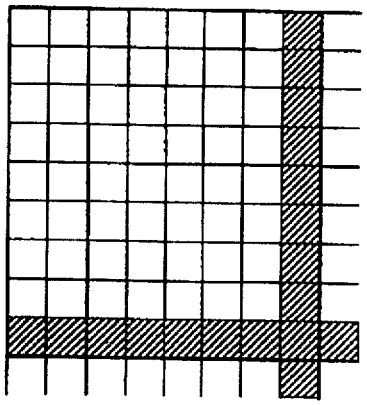

FIG. 9A shows the thinning position in case of the ½ reduction. FIG. 9B shows the thinning position in case of the ⅔ reduction. FIG. 9C shows the thinning position in case of the ⅘ reduction. FIG. 9D shows the thinning position in case of the ⅞ reduction. In the diagram, the pixel position shown by hatched portion indicates the position at which the pixel is thinned out.

FIG. 9A shows the conversion for converting from (2×2) pixels into (1×1) pixel by thinning out one pixel from two pixels in both of the main scan and the sub scan. FIG. 9B shows the conversion from (3×3) pixels to (2×2) pixels by thinning out one pixel from three pixels in both of the main scan and the sub scan. FIG. 9C shows the conversion from (5×5) pixels to (4×4) pixels by thinning out one pixel from five pixels in both of the main scan and the sub scan. FIG. 9D shows the conversion from (8×8) pixels to (7×7) pixels by thinning out one pixel from eight pixels in both of the main scan and the sub scan.

In this case, not only the data at the corresponding pixel position is merely thinned out and deleted but also a logical arithmetic operation process of logical sum (OR) or logical product (AND) is executed between the pixel as a target to be thinned out and the adjacent pixel of the target pixel and the data can be also preserved as adjacent pixel information.

Figure 10:
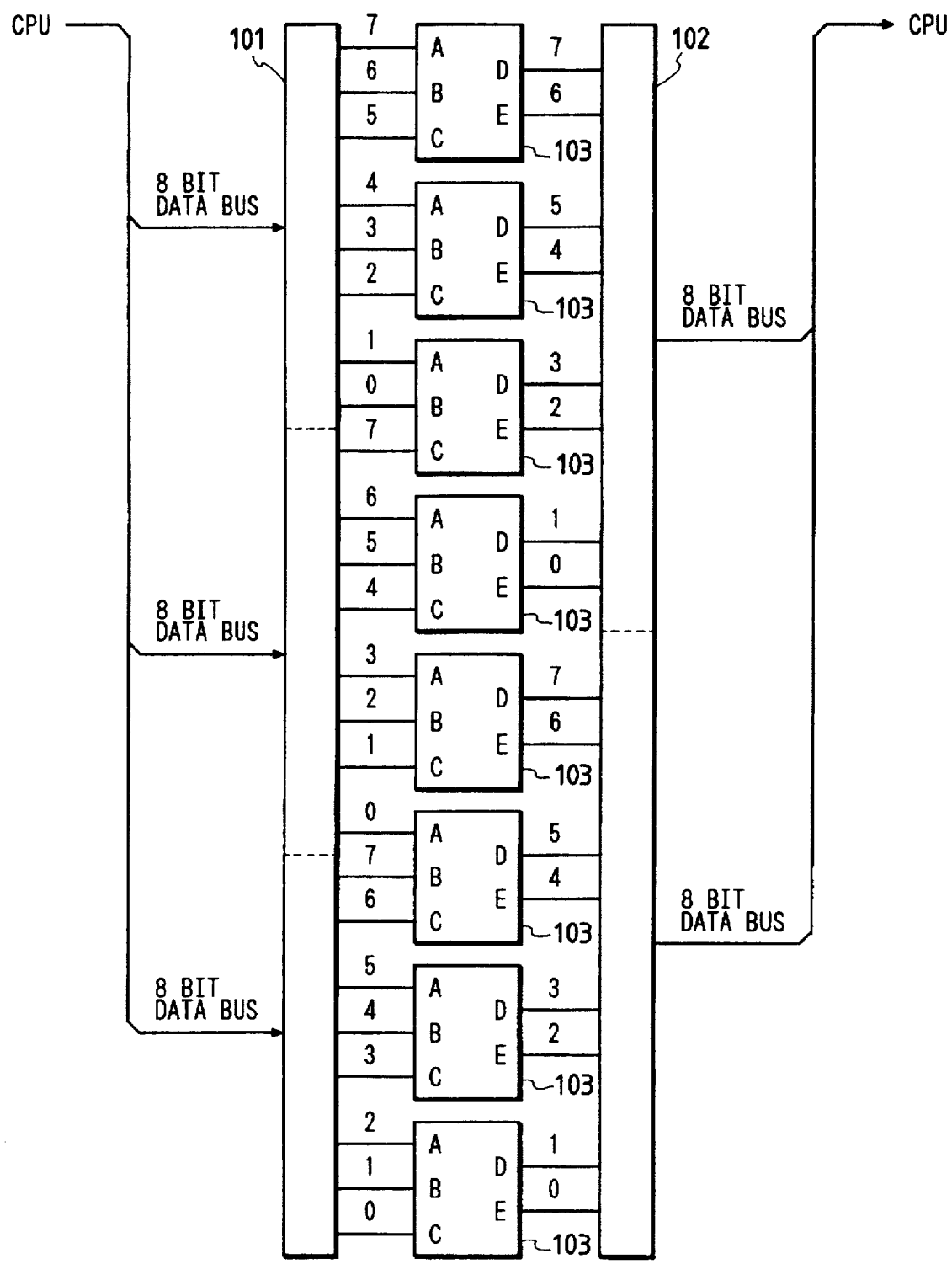
FIG. 10 is a diagram showing an example of a circuit construction for executing a ⅔ reduction process.

FIG. 10 shows an example of a circuit to execute the ⅔ reduction process.

In FIG. 10, reference numeral 103 denotes a reduction circuit to perform a thinning process. Signals A, B, and C denote input images. Signals D and E indicate output images after completion of the thinning process. In the circuit, the diagram shows the case of reducing the image data of 24 bits into ⅔, namely, the data of 16 bits. Reference numeral 101 denotes an input port of three bytes to latch the original image data from a CPU and 102 indicates an output port of two bytes to output the reduction image data to the CPU.

In the reduction circuit 103, by directly outputting the signal B for the signal D and outputting the signal C for the signal E as they are and by deleting the signal A without outputting the signal A, the thinning process corresponding to the hatched portions in FIG. 9B can be executed. It is also possible to output the signal C for the signal E as it is and to output the result of the logical arithmetic operating process such as OR or AND of the signals A and B for the signal D.

In the case where the signals D and E are obtained by a simple thinning process without performing the logical arithmetic operating process, the data corresponding to the signal A perfectly drops, so that there is a case where thin line information corresponding to one dot is erased.

In this instance, when the signals D and E are decided by using the logical arithmetic operating process by the OR, the information of the signal A corresponding to the thinning process is preserved, so that thin line information is preserved. However, since a probability such that the signal is set to "1" corresponding to the on dot is high as shown in FIG. 11. Therefore, at a magnification of a high reduction ratio, since the dot density is high, there is a case where the image becomes dark. There is also a case where a white blank thin line is extinguished.

When the signals D and E are determined by using the logical arithmetic operating process by the AND process, on the other hand, a white blank thin line can be preserved although a black thin line cannot be preserved. However, since a probability in which the signal is set to "1" corresponding to one dot is low as shown in FIG. 11, at a magnification of a high reduction ratio, there is a case where the image becomes bright because the dot density is low.

Therefore, means for obtaining the signals D and E can be also properly varied in accordance with the image which is output so as not to lose the picture quality. Namely, it is also possible to construct in a manner such that when the operator wants to darken an output image, the thinning process by OR is executed, and when he wants to brighten an output image, the thinning process by AND is performed.

Although the processes can be performed by the present circuit in both of the main-scan direction and the sub-scan direction, it is also possible to perform the process by the present circuit in either one of the main-scan direction and the sub-scan direction and to execute the arithmetic operating process by a similar software in the CPU.

Even at other magnifications, the processes can be also executed similarly by a circuit or an arithmetic operating process by a software.

FIGS. 12A to 12E show images which are obtained by performing the thinning process to character image data. FIG. 12A shows an original image. FIG. 12B shows an image which is obtained by performing the ⅞ reduction process. FIG. 12C shows an image which is obtained by performing the ⅘ reduction process. FIG. 12D shows an image which is obtained by executing the ⅔ reduction process. FIG. 12E shows an image which is obtained by performing the ½ reduction process.

By the above method, in case of the image data, the data in which the equal magnification conversion process was executed to the recording apparatus by the data conversion process 1 using the foregoing conversion pattern table is again subjected to the conversion by the thinning process by the data conversion process 2. In case of the character image data, the conversion by the thinning process by the data conversion process 2 is executed to the character pattern which was developed in accordance with the received character code. Due to this, an image of a desired magnification is output.

In case of a character image, data is generally sent by a character code as mentioned above. The character code is judged in the apparatus. The corresponding character image pattern is formed by using the internal character pattern table and a character image is output. Further, in the data conversion process 2, by executing the process to repeat the same data in order to convert one pixel into (n×n) (n is an integer) pixels, an image which was enlarged to a desired size can be obtained.

The character pattern provided in the apparatus has been set in accordance with the resolution. In the apparatus of the embodiment, the character pattern is set at a resolution of 360 dpi. In case of outputting at an equal magnification, therefore, the foregoing data conversion processes 1 and 2 are not executed with respect to the image by the character code information.

According to the above method, the image data of a resolution lower than the resolution of the recording apparatus can be used, so that an amount of image data of the same size can be remarkably reduced. Therefore, loads of the image data process of the host computer and the image data transfer to the recording apparatus are reduced. The process and transfer can be performed at high speeds. The recording time is also reduced. Particularly, in a high speed printing mode, a large effect is obtained.

(Embodiment 2)

In the first embodiment, after the image data was enlarged to the equal magnification size of 360 dpi, the reduction magnification process by the thinning process is executed together with the image data. In the embodiment 2, explanation will now be made with respect to a method whereby the image data and the character image data are classified and the image data is converted into a desired image size by a single process and the thinning reduction magnification process is executed to the character image data in a manner similar to the embodiment 1.

Figure 22:
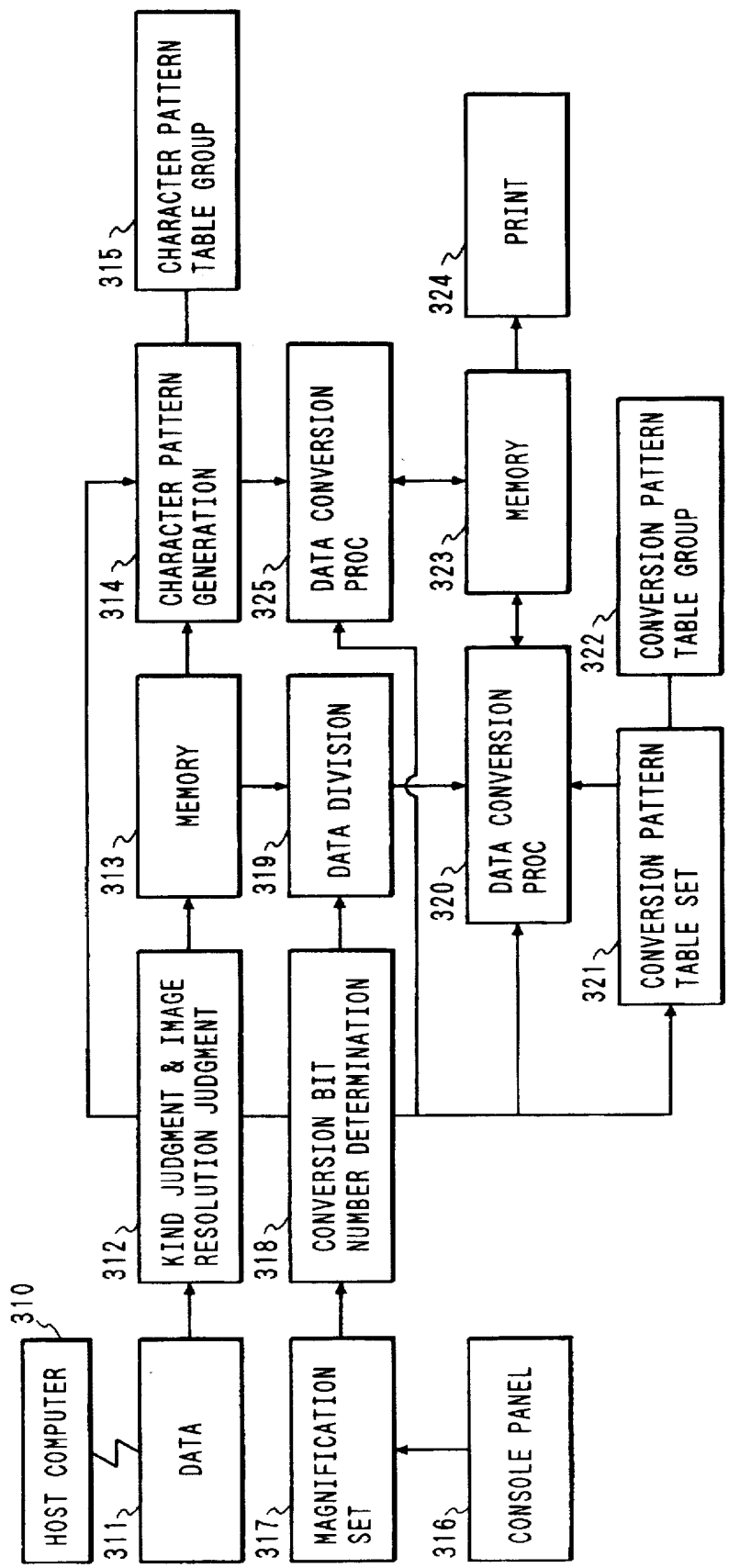
FIG. 22 is a block diagram showing an outline of a data process in another embodiment of the invention.

An outline of an image signal process in the embodiment 2 of the invention will be first described. FIG. 22 is an explanatory diagram showing an outline of the data conversion process in the embodiment of the invention.

Image data which is sent from a host computer 310 or the like is received in a block 311. In this instance, as image data which is sent from the host computer 310 or the like, the character image data comprising character code information and the image data comprising binarized bit map information can mixedly exist. The character image data and the image data can be easily judged in a block 312 by a format of a control command included in the image data and the contents of the signal. Further, in case of the image data, a resolution of the image can be also judged.

The received image data is temporarily stored into a memory 313.

In the case where the data is the image data, the number of conversion bits is decided in a block 318 on the basis of magnification information from a magnification setting unit 317 and resolution information of the image in accordance with the image output magnification designated by a console panel 316.

For instance, it is now assumed that a resolution of the recording apparatus is set to P (dpi) and a resolution of the image data is set to I (dpi) and a conversion magnification is set to α. In this case, it is necessary to convert one pixel into [α×(P/I)] pixels. Therefore, the bit conversion from (n) bits into [α×n×(P/I)] bits is executed.

The image data in the memory is divided into the data of a predetermined number of pixels (n bits) by a data division unit 319. A data conversion processing unit 320 executes a data conversion process by using a conversion pattern table 322. The converted data is stored into a memory 323. The memory 323 can be also commonly used as a memory which is necessary for the data conversion process.

The conversion pattern table is a table to decide a length of one-dimensional data to be converted in accordance with the magnification. (n) bits are converted into (n') bits [n'= α×n×(P/I)] bits. The conversion pattern table is selected from the conversion pattern table group 322 in accordance with conversion bit number decision information. The optimum conversion pattern table is set by conversion pattern table setting means 321.

In the case where the data is the character image data, a character pattern corresponding to the character code information in the memory 313 is selected from a character pattern table group 315. The selected character pattern is developed by a character pattern generation unit 314. After a data conversion process 325 was performed, the converted data is stored into the memory 323.

The character image pattern is a pattern which was decided by using the resolution of the recording apparatus. The data conversion process is executed to the character image pattern in the block 325. In this case, the data is converted by the thinning-process by a conversion bit number decision signal. When the magnification is set to the reduction magnification of α times (α<1), the thinning process for thinning (N) bits into (α×N) bits is executed and the resultant data is stored into the memory 323. In a manner similar to the case of the image data, the memory 323 can be also commonly used as a memory which is necessary for the data conversion process.

In the image data in the memory 323, both of the character image data and the image data have been converted into the bit map information of the image of a desired magnification and a target image is output by printing as they are.

In the above construction, the number of conversion bits has been decided through the console panel and magnification setting unit. However, in case of an apparatus which can output an image at only an equal magnification, the number of conversion bits can be also automatically decided in the apparatus on the basis of the judgment result of the resolution of a control command signal included in the received image data and the ratio of the resolution of the recording apparatus. Further, the conversion magnification information can be also included in the control command signal.

By the above construction, even in case of an image in which the image information and character image information of different resolutions mixedly exist, it can be variably magnified and an image of a desired size can be obtained.

FIG. 13 is a flowchart for a magnification conversion process in the second embodiment. In step S1301, a magnification is set. In step S1302, image data is input. A check is made in step S1303 to see if the input image data is the character image data comprising a character code or the image data comprising the bit map data.

In a manner similar to the foregoing embodiment, the character image data and the image data can be easily discriminated by the control command signal which is sent before the image data. In step S1303, when it is judged that the input image data is the character image data, the corresponding character pattern is developed in step S1305. The data conversion process 2 (325 in FIG. 22) is executed in accordance with the designated magnification. When it is judged that the input image data is the image data, the data conversion process 1 (320 in FIG. 22) is executed in accordance with the designated magnification in step S1304. The image data after completion of the conversion process is output in step S1307.

The data conversion process 1 in step S1304 will now be described.

Figure 14:
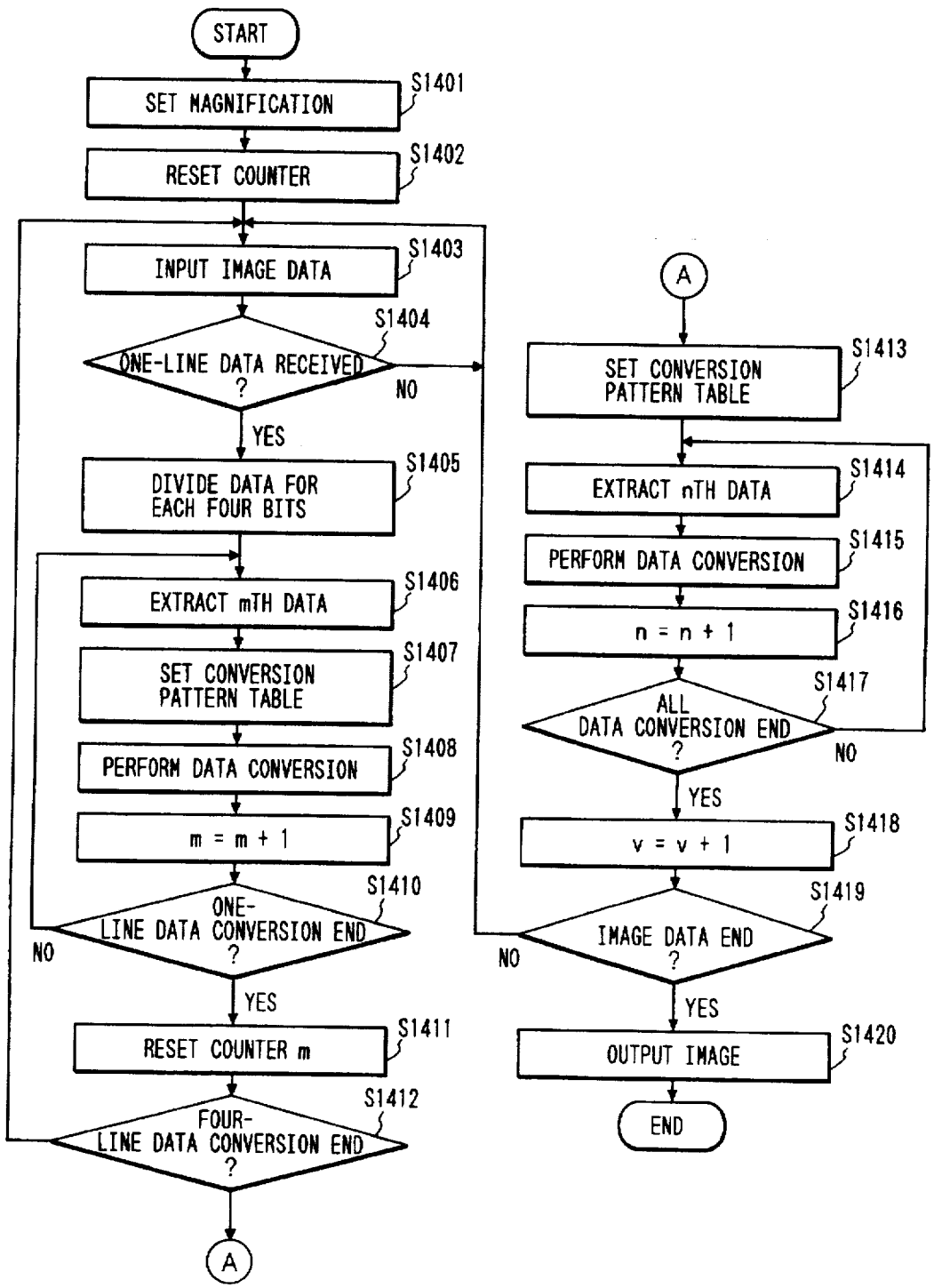
FIG. 14 is a diagram showing an example of a flowchart for a data conversion process 1 in FIG. 13.

FIG. 14 is a flowchart for the data conversion process 1.

A magnification is set in step S1401. In step S1402, all of the counters which are used for the conversion process are reset. In step S1403, the image data is input. In step S1404, a check is made to see if the image data of one line has been received or not. When the image data of one line is received, the data is divided every four bits in step S1405. In step S1406, the mth data in the divided data is extracted. In step S1407, the conversion pattern table according to the magnification is set. In step S1408, the data is converted in accordance with the conversion pattern table which was set in step S1407. In step S1409, a count value of a counter (m) is increased by "1". Until it is judged that the conversion of the data of one line (one dot line) is finished in step S1410, the processes in steps S1406 to S1410 are repeated.

When it is judged in step S1410 that the data process of one line (one dot line) has been finished, the counter (m) is reset in step S1411. Until it is judged in step S1412 that the data process of four lines (four dot lines) is finished, the processes in steps S1403 to S1412 are repeated.

When it is judged in step S1412 that the data process of four lines (four dot lines) is finished, the conversion pattern table according to the magnification is set in step S1413. The nth data is extracted in step S1414. The extracted data is converted in accordance with the set conversion pattern table in step S1415. In step S1416, the count value of a counter (n) is increased by "1". Until it is judged in step S1417 that the conversion of all data of four lines (four dot lines) is finished, the processes in steps S1414 to S1417 are repeated.

When it is judged in step S1417 that the conversion of all data of four lines (four dot lines) has been finished, the count value of a counter (V) is increased by "1" in step S1418. Until it is judged in step S1419 that the image data is finished, the processes in steps S1403 to S1419 are repeated. When it is judged in step S1419 that the image data is finished, the image is output in step S1420 and the processing routine is finished. The image can be also arbitrarily output at a time point when the conversion of a data amount (as much as 64 dot lines) which is necessary for one scan recording is finished.

FIGS. 15 to 18 show conversion pattern tables which are used for the variable magnification process.

Figure 16:
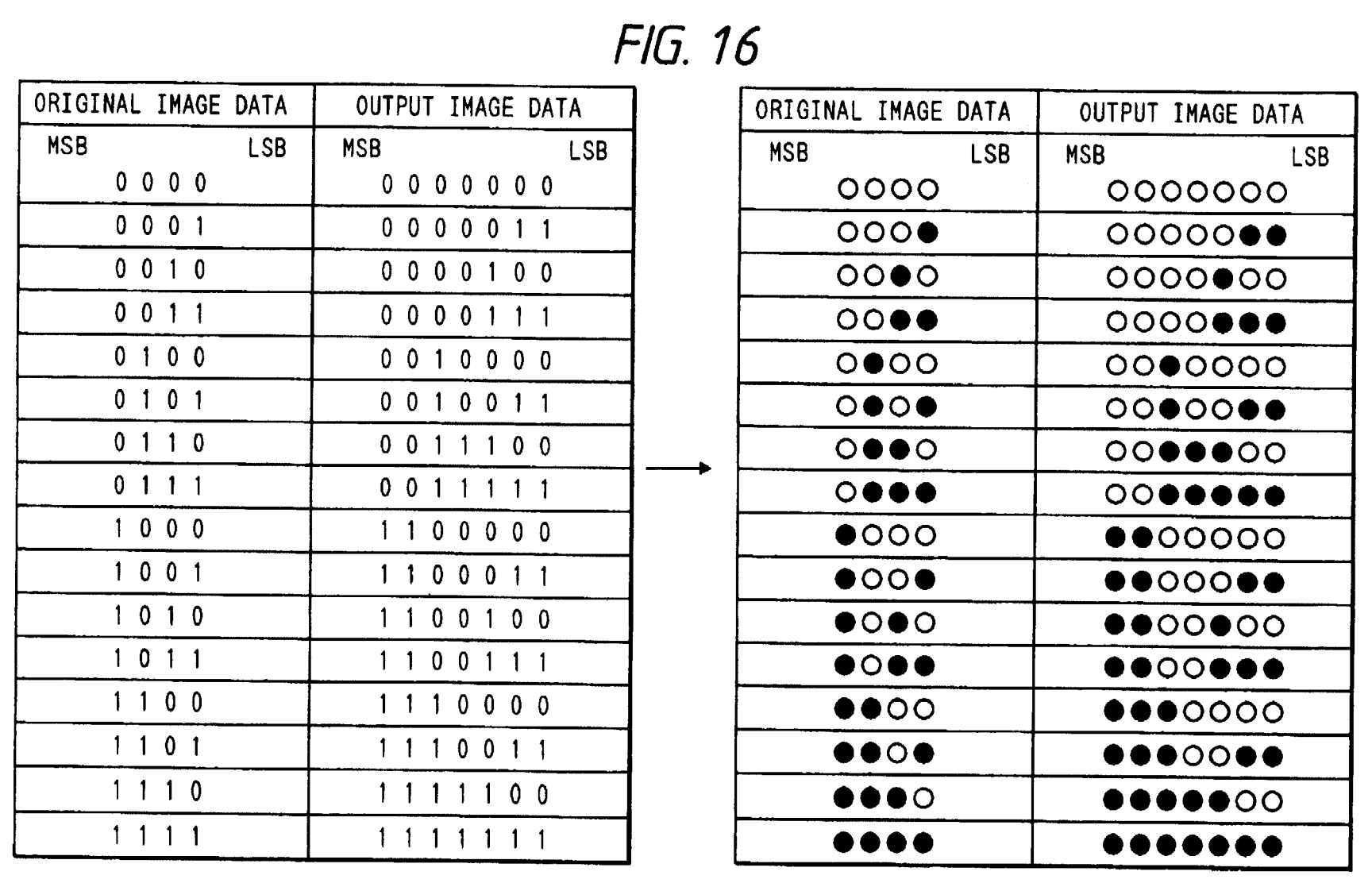
Figure 17:
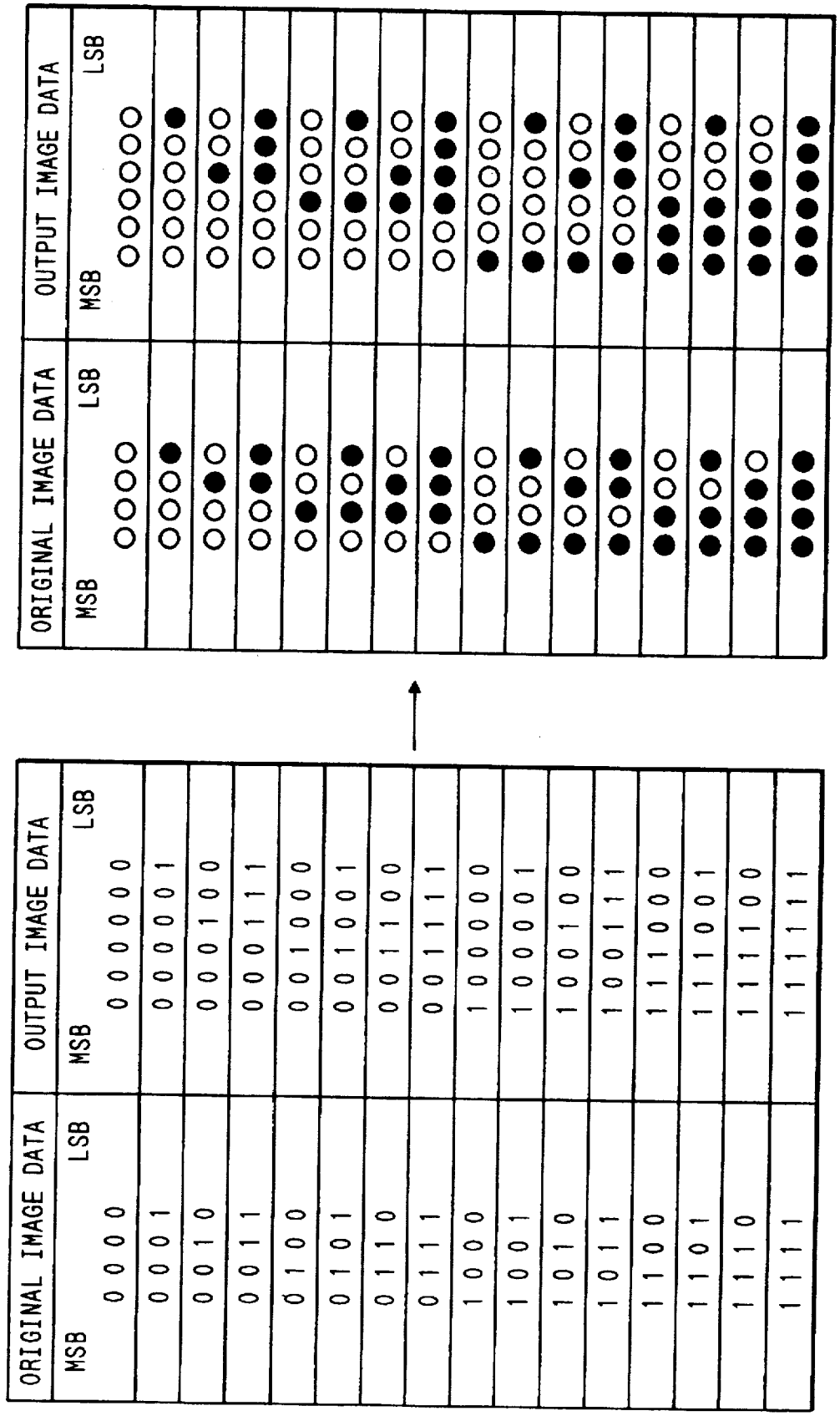
FIG. 17 is a diagram showing an example of a conversion pattern table for converting four pixels into six pixels.
Figure 18:
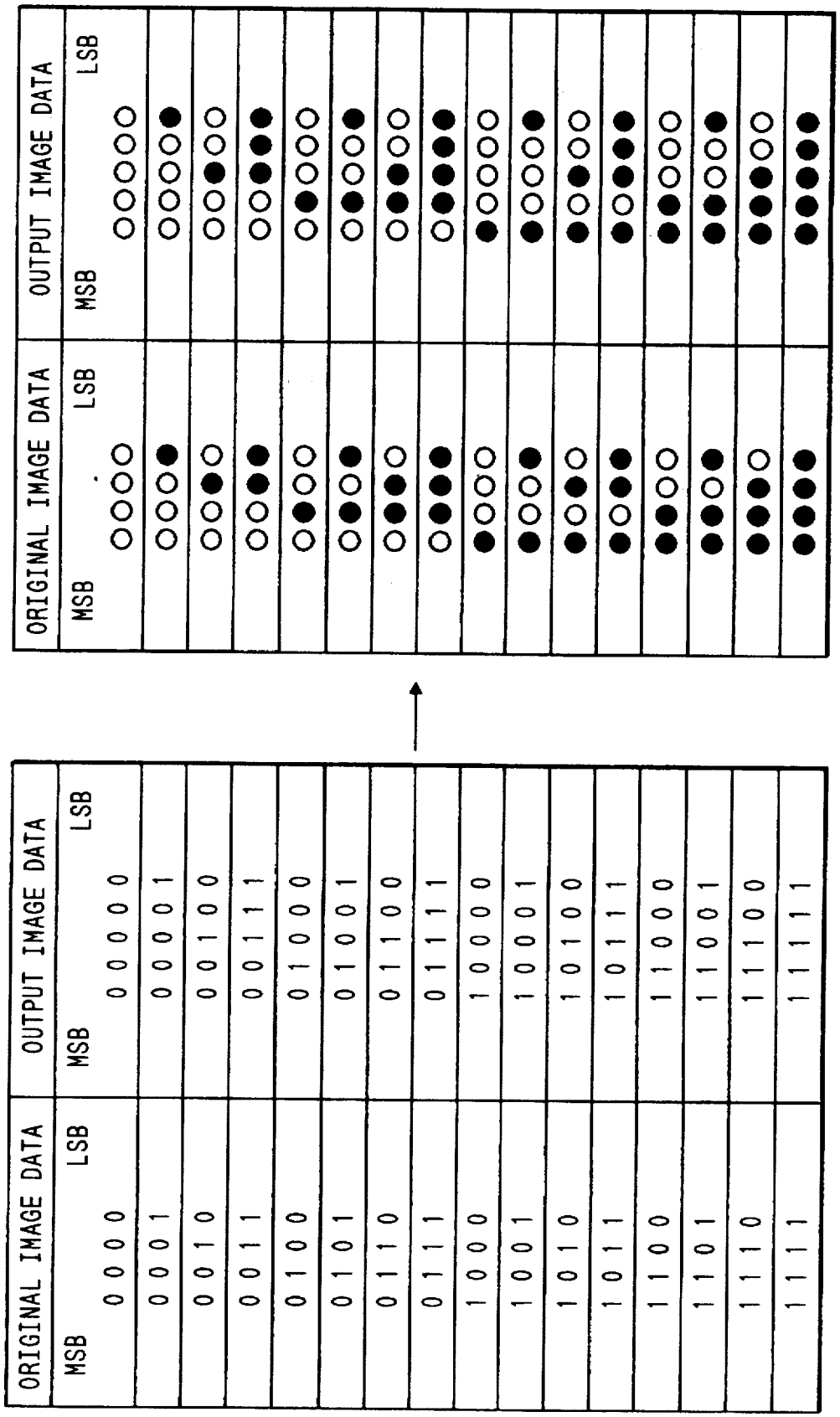
FIG. 18 is a diagram showing an example of a conversion pattern table for converting four pixels into five pixels.

FIG. 15 shows a conversion pattern table which is used in case of converting from four pixels to eight pixels. FIG. 16 shows a conversion pattern table which is used in case of converting from four pixels to seven pixels. FIG. 17 shows a conversion pattern table which is used in case of converting from four pixels to six pixels. FIG. 18 shows a Conversion pattern table which is used for converting from four pixels to five pixels.

When a resolution of the original image data is equal to 160 dpi, it corresponds to the image which was enlarged from 24 pixels to 47 pixels in the ⅞ reduction, the image which was enlarged from 24 pixels to 43 pixels in the ⅘ reduction, and the image which was enlarged from 24 pixels to 27 pixels in the ½ reduction, respectively. (Since the resolution of the recording apparatus is equal to 360 dpi, in case of the ⅞ reduction, 160 dpi is converged to 360 dpi and the data is enlarged into ⅞ after that. Therefore, 24 pixels are converted into about 47 (≈=24×160/360×⅞) pixels.)

When a resolution of the original image data is equal to 180 dpi, it corresponds to the image which was enlarged from 24 pixels to 42 pixels in the ⅞ reduction, the image which was enlarged from 24 pixels to 38 pixels in the ⅘ reduction, the image which was enlarged from 24 pixels to 36 pixels in the ⅔ reduction, and the image which was enlarged from 24 pixels to 32 pixels in the ⅔ reduction, respectively. In case of the ½ reduction, the input image data is output as it is. Due to this, the conversion process can be realized.

Figure 19C:
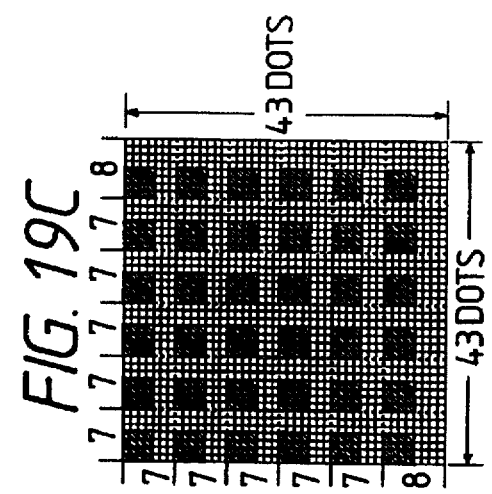
FIGS. 19A to 19E are diagrams showing variable magnification processing methods of 160 dpi.
Figure 19E:
Figure 19B:
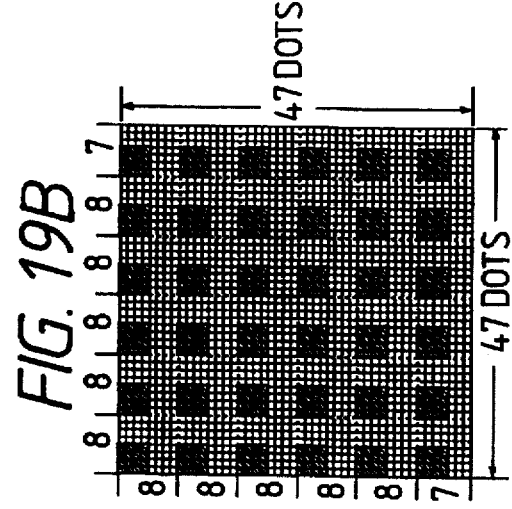
Figure 19D:
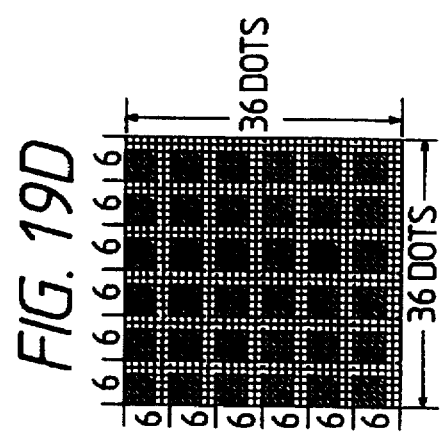
Figure 19A:
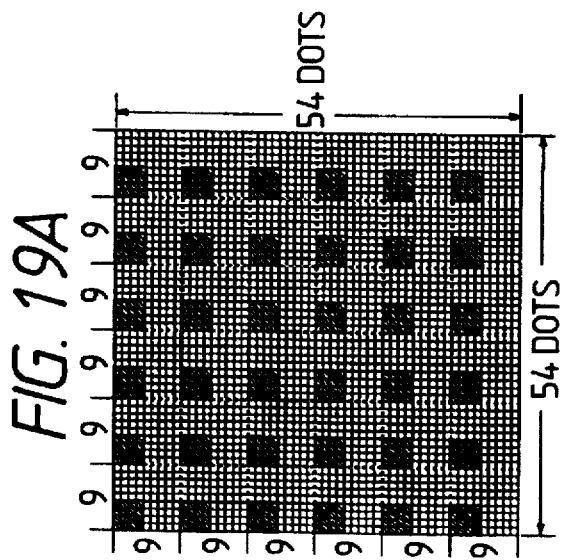

FIGS. 19A to 19E show variable magnified images of the image which was input at a resolution of 160 dpi. A hatched portion shows the size of original image in each block. FIG. 19A shows the case where the process corresponding to the equal magnification was performed. Every four pixels of the original image are converted into nine pixels in both of the main-scan direction and the sub-scan direction by using the conversion pattern table in FIG. 15.

FIG. 19B shows the case where the process corresponding to the ⅞ reduction was executed. (4×5) pixels of the original image are converted into every eight pixels in both of the main-scan direction and the sub-scan direction by using the conversion pattern table in FIG. 15. The last four pixels are converted into seven pixels by using the conversion pattern table in FIG. 16.

FIG. 19C shows the case where the process corresponding to the ⅘ reduction was executed. (4×5) pixels of the original image are converted into every seven pixels in both of the main-scan direction and the sub-scan direction by using the conversion pattern table in FIG. 16. The last four pixels are converted into eight pixels by using the conversion pattern table in FIG. 15.

FIG. 19D shows the case where the process corresponding to the ⅔ reduction was executed. Four pixels of the original image are converted into six pixels in both of the main-scan direction and the sub-scan direction by using the conversion pattern table in FIG. 17.

FIG. 19E shows the case where the process corresponding to the ½ reduction was executed. (4×2) pixels are not converted in both of the main-scan and sub-scan directions but next four pixels are converted into five pixels by using the conversion pattern table in FIG. 18.

FIGS. 20A to 20E show variably magnified images of the image which was input at a resolution of 180 dpi. FIG. 20A shows the case where the process corresponding to the equal magnification was executed. Every four pixels of the original image are converted into eight pixels in both of the main-scan and sub-scan directions by using the conversion pattern table in FIG. 15.

FIG. 20B shows the case where the process corresponding to the ⅞ reduction was executed. Every four pixels of the original image are converted into seven pixels in both of the main-scan and sub-scan directions by using the conversion pattern table in FIG. 16.

FIG. 20C shows the case where the process corresponding to the ⅘ reduction was executed. (4×2) pixels of the original image are converted into every six pixels in both of the main-scan and sub-scan directions by using the conversion pattern table in FIG. 17. Next four pixels are converted into seven pixels by using the conversion pattern table in FIG. 16.

FIG. 20D shows the case where the process corresponding to the ⅔ reduction was executed. (4×2) pixels of the original image are converted into every five pixels in both of the main-scan and sub-scan directions by using the conversion pattern table in FIG. 18. Next four pixels are converted into six pixels by using the conversion pattern table in FIG. 17.

FIG. 20E shows the case where the process corresponding to the ½ reduction was executed. The conversion process is not executed in both of the main-scan and sub-scan directions.

As already mentioned above, the following magnifications can be set in the apparatus: equal magnification; ⅞ reduction magnification in case of outputting the image of the A4 size by the B5 size; ⅘ reduction magnification in case of outputting the image of the B4 size by the A4 size; ⅔ reduction magnification in case of outputting the image of the A3 size by the A4 size or in case of outputting the image of the B4 size by the B5 size; and ½ reduction magnification.

In the apparatus, four pixels are set to a subblock and blocks of every 24 pixels are managed. In this instance, in case of the image data of 160 dpi, the following conversion processes are necessary: conversion process from 24 pixels to 54 pixels in case of the equal magnification; conversion process from 24 pixels to 47.25 pixels in case of the ⅞ reduction magnification; conversion process from 24 pixels to 43.2 pixels in case of the ⅘ reduction magnification; conversion process from 24 pixels to 36 pixels in case of the ⅔ reduction magnification; and conversion process from 24 pixels to 27 pixels in case of the ½ reduction magnification, respectively. On the other hand, in case of the image data of 180 dpi, the following conversion processes are necessary: conversion process from 24 pixels to 48 pixels in case of the equal magnification; conversion process from 24 pixels to 42 pixels in case of the ⅞ reduction magnification; conversion process from 24 pixels to 38.4 pixels in case of the ⅘ reduction magnification; conversion process from 24 pixels to 32 pixels in case of the ⅔ reduction magnification; and non-conversion process of 24 pixels in case of the ½ reduction magnification, respectively.

However, in case of the ⅞ reduction magnification and ⅘ reduction magnification of the image of 160 dpi and the ⅘ reduction magnification of the image of 180 dpi, the number of conversion pixels is not equal to an integer value. Therefore, the conversion of 47 pixels in case of the ⅞ reduction magnification of the image of 160 dpi and the conversion of 43 pixels in case of the ⅘ reduction magnification are executed. In case of the ⅘ reduction magnification of the image of 180 dpi, the conversion of 38 pixels is performed.

On the other hand, in order to accurately match the size of output image, it is sufficient to execute the following conversion: namely, conversion to 48 pixels every five blocks in case of the ⅞ reduction magnification of the image of 160 dpi; conversion to 44 pixels every five blocks in case of the ⅘ reduction magnification; and conversion to 40 pixels every five pixels in case of the ⅘ reduction magnification of the image of 180 dpi.

On the other hand, in case of the ⅞, ⅘, and ½ reduction magnifications in the image of 160 and the ⅘ and ⅔ reduction magnifications in the image of 180 dpi, when the subblocks each consisting of four pixels are processed by an amount of the block of 24 pixels by using the conversion pattern table of one kind of specific variable magnification amount, the number of pixels after completion of the conversion cannot be made to coincide with a desired number of pixels. In such a case, a plurality of conversion pattern tables are combined and the number of pixels is converted into a predetermined number of conversion pixels. The combination order of the conversion pattern tables is not limited to the orders shown in FIGS. 19A to 19E and 20A to 20E but it is sufficient to arbitrarily combine them while paying an attention to the occurrence of a texture such as an unpleasant moire pattern or the like in an output image.

In each of the conversion pattern tables, only the number of conversion pixels is limited and the conversion contents are not limited to those shown in the embodiment.

That is, it is also possible to prepare a plurality of conversion pattern tables in accordance with the image or color and to switch and use a proper table in a manner similar to the foregoing embodiments. Further, the above conversion pattern table can be also varied in accordance with the kind of recording material or the recording control method of the apparatus. On the other hand, in the above method, the conversion process has been executed by using the conversion pattern table in both of the main-scan and sub-scan directions in a manner similar to the foregoing embodiments. However, it is also possible to use a method whereby the conversion process is performed by using the conversion pattern table in either one of the main-scan and sub-scan directions and the previous information is repeated by the necessary number of times with respect to the other remaining direction or new pattern information is interpolated by the conversion pattern information before and after by logical arithmetic operating means by the OR, AND, or the like, thereby obtaining the converted data. For instance, it is also possible to use a method whereby the conversion process is executed by using the conversion pattern table with respect to the main-scan direction and the data after completion of the conversion process in the main-scan direction is repeated by the necessary number of times with respect to the sub-scan direction or new pattern information is obtained by logical arithmetic operating means such as OR, AND, or the like on the basis of the data after the conversion in the main-scan direction before and after, and the data of the necessary portion is interpolated. It will be also obviously understood that the conversion pattern table is used in only the sub-scan direction and it is sufficient to select more efficient means by a format of the data which is sent.

In a manner similar to the above, the above method is also limited to the image data of 160 dpi and 180 dpi but by preparing a plurality of conversion tables corresponding to various kinds of resolutions, the invention can also cope with the image data of various resolutions. After the conversion process from 80 dpi to 160 dpi or from 90 dpi to 180 dpi was performed to the image data of a lower resolution such as 80 dpi, 90 dpi, or the like by a processing method similar to the conversion process from 180 dpi to 360 dpi, the conversion process from 160 dpi to the data of a desired magnification or from 180 dpi to the data of a desired magnification as mentioned above can be also executed.

The data conversion process 2 which is executed in step S1306 in FIG. 13 will now be described.

In case of a character image, data is generally sent by a character code. The character code is discriminated in the apparatus. The corresponding character image pattern is formed by using the character pattern table provided in the apparatus, and a character image is output.

The internal character patterns have been preset in accordance with the resolution of the apparatus. In the apparatus of the embodiment, the patterns have been set at 360 dpi.

In the case where the variable magnification process was executed by a method similar to that of the foregoing image data, although the enlargement process can be performed, the reduction process cannot be performed and a magnification of the data after completion of the variable magnification process doesn't coincide with the variable magnification of the image data.

In case of a character image, the thinning process is executed in accordance with the rule described in FIGS. 8A to 8C in the foregoing embodiment, thereby obtaining a reduction character image. Further, in case of a character image, by executing the repeating process of the same data for converting one pixel into (n×n) (n is an integer) pixels, the character image can be converted into an enlarged image. In this instance, it is sufficient to use a conversion pattern table by which a desired enlarged image can be obtained for the image.

According to the embodiment as described above, by discriminating the character image which is sent by the character code and the image data and by executing the variable magnification process by a different method, an image of a desired size can be obtained. Further, according to the above method, since there is no need to perform the double conversion processes to the image data, there is an effect of the improvement of the processing speed.

According to the above method, in a manner similar to the foregoing embodiments, the image data of a resolution lower than the resolution of the recording apparatus. Therefore, a data amount in the image data of the same size can be remarkably reduced and the load of the image data process of the host computer and the load of the image data transfer to the recording apparatus are reduced. The high speed process and high speed transfer can be performed. The recording time can be reduced. Particularly, there is a large effect in the high speed printing mode.

In addition, there is also an advantage such that it is sufficient to use a small occupied memory area amount of the conversion matrix table. For example, when a variable magnification process similar to that in the embodiment is realized by using the conversion matrix pattern table of the 2-dimensional array by setting (4×4) pixels into a reference, there are used total 851968 (=13×65536) kinds of conversion matrix pattern table data corresponding to the conversion processes for converting into (4×5) pixels, (5×4) pixels, (5×5) pixels, (5×6) pixels, (6×5) pixels, (6×6) pixels, (6×7) pixels, (7×6) pixels, (7×7) pixels, (7×8) pixels, (8×7) pixels, (8×8) pixels, and (9×9) pixels. However, when the conversion pattern table of a one-dimensional array using four pixels as a reference as shown in the embodiment is used, it is sufficient to use total 80 (=5×16) kinds of conversion pattern table data corresponding to the conversion processes for converting into five pixels, six pixels, seven pixels, eight pixels, and nine pixels. In the conversion processes of a two-dimensional array, it is necessary to store a predetermined amount of data. However, in case of the conversion processes of a one-dimensional array, the image data which is sent can be sequentially converted.

(Embodiment 3)

Figure 23A:
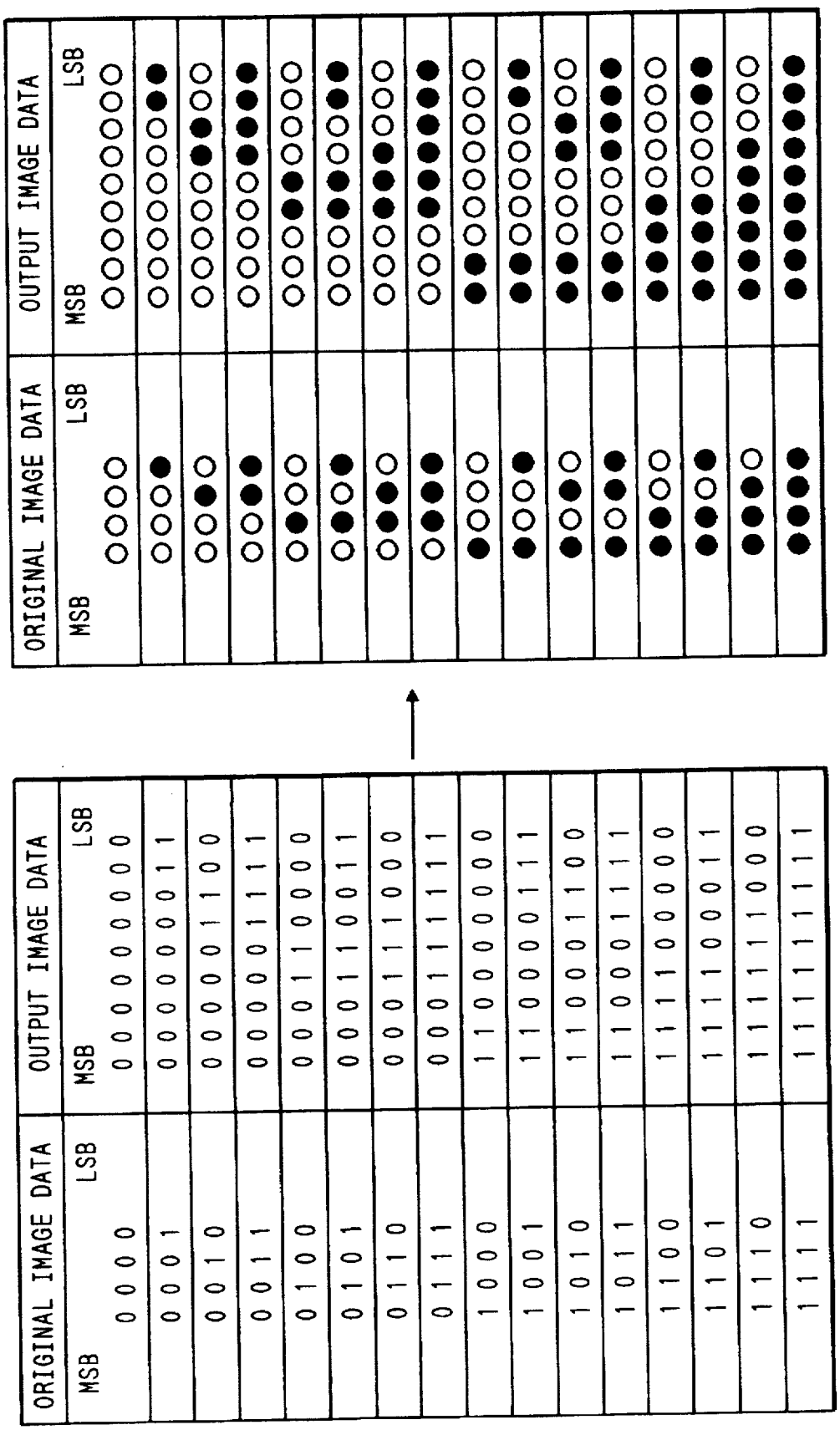
FIGS. 23A and 23B are diagrams showing examples of conversion pattern tables for performing the conversion from four pixels to nine pixels and the conversion from nine pixels to six pixels in other embodiments of the invention.
Figure 23B:
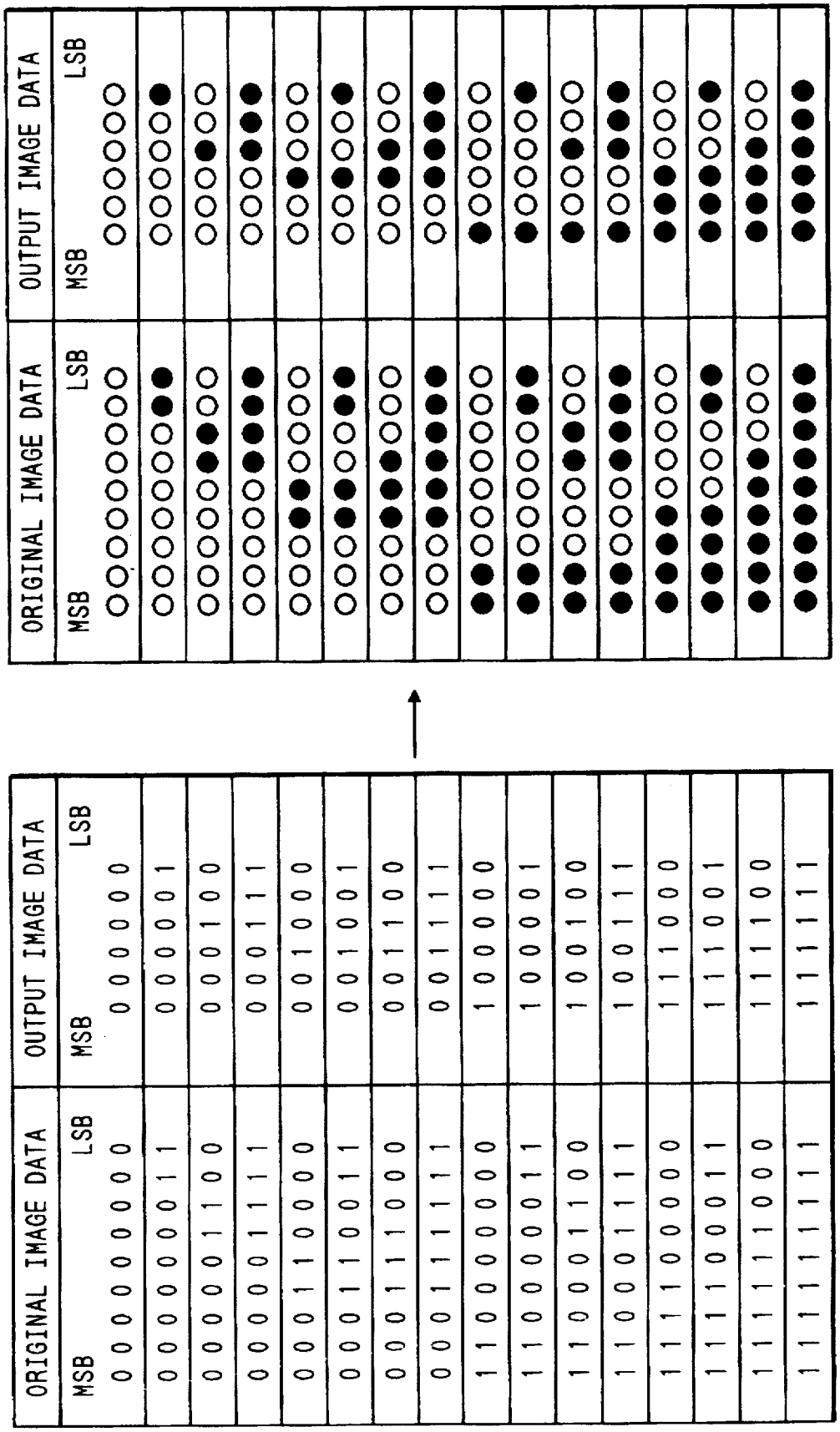

The embodiment 3 will now be described with respect to a method performing the variable magnification process by using the conversion pattern table after the image data was enlarged to the data of the equal magnification size of 360 dpi. The case of reducing the image data of 160 dpi into ⅔ will now be described. FIGS. 23A and 23B show examples of the conversion pattern table.

First, in a manner similar to the foregoing embodiment, the image data is converted from four pixels to nine pixels by using an enlargement conversion pattern table in FIG. 23A, thereby obtaining the image data of the equal magnification size. Subsequently, the image data is converted from nine pixels to six pixels by using a reduction conversion pattern table of FIG. 23B, thereby obtaining an image of a desired magnification size.

By preparing a plurality of enlargement conversion pattern tables and reduction pattern tables, the image data of various resolutions can be converted into the image data of a desired magnification.

In the conversion process using the enlargement and reduction conversion pattern tables in the above embodiment, even a character image comprising a character pattern developed in accordance with the character code information can be also converted into a character image of a desired magnification. By properly selecting the optimum table from a plurality of enlargement and reduction conversion pattern tables which are prepared in accordance with the resolution of the image data, the variable magnification, or the kind indicating whether the input image data is the image data or the character image data, a variable magnification processing output of the image can be also performed by only a converting method using the conversion pattern table.

The embodiment is particularly effective in the case where the apparatus has a page memory and also has a mode to record the same data contents a plurality of number of times.

According to the invention, in case of the apparatus of the on-demand type of a high recording speed like an ink jet recording apparatus, there are many cases such that the delay of the recording is dominant to the image process. However, by applying the invention, the inherent characteristics can be effectively used. A method such that the contents of the data in the conversion pattern table are changed in consideration of a ratio of blur of the ink or the table itself is selected in accordance with the recording medium is practical and preferable.

As will be obviously understood from the above description, in order to convert the one-dimensional data comprising (M) data of the typical invention of the present invention into the data of a desired resolution, the one-dimensional data having (M) data is table converted every data number (N) which has been predetermined in accordance with the desired resolution by using a resolution conversion table of the data number (K:K≠N) to be previously converted in accordance with the desired resolution every desired resolution corresponding to the data number (N:N is a common measure of M) smaller than the data number (M). Or, the above one-dimensional data is divided into the data of (A) bits so that the ratio of [resolution X (dpi): resolution Y (dpi)] is equal to the ratio (A:B) of A and B which have the mutually prime relation, and the divided one-dimensional data of a predetermined bit number (A) is converted into the one-dimensional data of the bit number (B) by using a conversion pattern table to the bit number (B) according to the contents of the divided data of the bit number (A). Due to this, the minimum unit at which the reproducibility of the data can be maintained is expanded. The data can be immediately converted in accordance with the contents of the divided data of the bit number (A). A temporary memory capacity for the conversion process can be reduced. A high speed process can be accomplished.

In addition, according to the invention using the resolution of the printer of the invention as a reference, even in the case where the resolution of the image data is lower than the resolution of the printer, the image can be output at a desired size. That is, the recordable image data of different resolutions can be commonly used. According to the invention including the character image information of the invention, even in the image in which the image information and character image information of resolutions different from the resolution of the recording apparatus, an image of a desired size can be derived.

In case of reducing a large image and outputting to a small paper or in case of outputting a plurality of images onto one sheet of paper in a lump, the variable magnification process can be easily performed.

What is claimed is:

1. A data processing method for converting data of a resolution X into data of a resolution Y higher than said resolution X, comprising:

a first dividing step of dividing the data of the resolution X every A bits in a first direction;

a first converting step of converting the divided A-bit data into B-bit data of a bit number B by using a first conversion pattern table;

a second dividing step of dividing the data which was obtained by repeating the conversion by said first converting step by a number of times equal to a number of lines in a second direction, every A bits;

a second converting step of converting the divided A-bit data into the B-bit data of the bit number B by using a second conversion pattern table; and a reducing step of reducing the data that was converted by said second converting step.

2. A method according to claim 1, wherein the contents of said first and second conversion pattern tables are equal.

3. A method according to claim 1, further having a reducing step of reducing the data of the resolution Y which was derived by said second converting step.

4. A method according to claim 3, wherein in said reducing step, the data of the resolution Y is reduced by a thinning process.

5. A method according to claim 3, wherein in said reducing step, the data of the resolution Y is reduced by a third conversion pattern table.

6. A data processing apparatus comprising:

input means for inputting data of a first resolution;

converting means for converting the data of the first resolution into data of a second resolution higher than said first resolution by using a first conversion pattern table; and reducing means for reducing the data of the second resolution which was converted by said converting means, wherein said reducing means reduces the data of the second resolution by a thinning process.

7. An apparatus according to claim 6, wherein said reducing means reduces the data of the second resolution by using a second conversion pattern table whose contents differ from the contents of said first conversion pattern table.

8. An apparatus according to claim 6, wherein said reducing means reduces the data of the second resolution by a thinning process.

9. An apparatus according to claim 6, further having recording means for recording the reduction image which was obtained by said reducing means.

10. An apparatus according to claim 9, wherein said recording means records the reduction image at a recording resolution of said second resolution.

11. A data processing apparatus comprising:

input means for inputting character code data and image data;

developing means for developing said input character code data into bit map data of a first resolution;

converting means for converting the input image data into image data of the first resolution by using a conversion pattern table, in a case where the resolution of the input image data is not equal to the first resolution; and reducing means for reducing the bit map data of the first resolution which was obtained by said developing means and the image data of the first resolution which was obtained by said converting means.

12. An apparatus according to claim 11, further having reducing means for reducing the data of the first resolution which was obtained by said developing means and said converting means.

13. An apparatus according to claim 11, wherein said reducing means reduced the data of the first resolution by using a conversion pattern table.

14. An apparatus according to claim 11, wherein said reducing means reduces the data of the first resolution by a thinning process.

15. A data processing apparatus comprising:

data input means for inputting character code data and image data;

magnification input means for inputting a variable magnification of an output image;

developing means for developing the input character code data into data of a first resolution;

first processing means for variably magnifying the data of the first resolution which was derived by said developing means into the data of the magnification which was input from said magnification input means; and second processing means for performing a data converting process to the magnified data so that the output image is an image of the magnification which was input from said magnification input means in consideration of a resolution of an output apparatus.

16. A data processing method comprising:

an inputting step of inputting data of a first resolution;

a converting step of converting the data of the first resolution into data of a second resolution higher than said first resolution by using a first conversion pattern table; and a reducing step of reducing the data of the second resolution which was converted by said converting step, wherein, in said reducing step, the data of the second resolution is reduced by a thinning process.

17. A method according to claim 16, wherein in said reducing step, the data of the second resolution is reduced by using a second conversion pattern table whose contents are different from the contents of said first conversion pattern table.

18. A method according to claim 16, wherein in said reducing step, the data of the second resolution is reduced by a thinning process.

19. A method according to claim 16, further having a recording step of recording the reduction image obtained by said reducing step.

20. A method according to claim 19, wherein in said recording step, the reduction image is recorded at a recording resolution of said second resolution.

21. A data processing method comprising:

an inputting step of inputting character code data and image data;

a developing step of developing the input character code data into bit map data of a first resolution;

a converting step of converting the input image data into image data of the first resolution by using a conversion pattern table, in a case where a resolution of the input image data is not equal to said first resolution; and a reducing step of reducing the bit map data of the first resolution which was obtained in said developing step and the image data of the first resolution which was obtained in said converting step.

22. A method according to claim 21, further having a reducing step of reducing the data of the first resolution which was obtained by said developing step and said converting step.

23. A method according to claim 21, wherein in said reducing step, the data of the first resolution is reduced by using a conversion pattern table.

24. A method according to claim 21, wherein in said reducing step, the data of the first resolution is reduced by a thinning process.

25. A data processing method comprising:

a data input step of inputting character code data and image data;

a magnification inputting step of inputting a variable magnification of an output image;

a developing step of developing the input character code data into data of a first resolution;

a first processing step of variably converting the data of the first resolution which was obtained by said developing step into the data of the magnification which was input by said magnification inputting step; and a second processing step of performing a data conversion process to the magnified data so that the output image becomes an image of the magnification which was input by said magnification inputting step in consideration of a resolution of an output apparatus.

* * * * *

UNITED STATES PATENT AND TRADEMARK OFFICE
CERTIFICATE OF CORRECTION

PATENT NO. : 5,704,019

DATED : December 30, 1997

INVENTOR(S): YUJI AKIYAMA ET AL.

It is certified that error appears in the above-identified patent and that said Letters Patent is hereby corrected as shown below:

COLUMN 2

Line 42, "made" should read --made to--;
Line 48, "above.," should read --above,--.

COLUMN 7

Line 24, "Of" should read --of--.

COLUMN 8

Line 24, "a image" should read --an image--.

COLUMN 16

Line 27, "Conver-" should read --conver---;
Line 39, "≈=" should read --≈--.

COLUMN 18

Line 26, "160" should read --160 dpi--;
Line 39, "an" (first occurrence) should be deleted.

COLUMN 19

Line 57, "of" should read --can have--.

UNITED STATES PATENT AND TRADEMARK OFFICE
CERTIFICATE OF CORRECTION

PATENT NO. : 5,704,019

DATED : December 30, 1997

INVENTOR(S): YUJI AKIYAMA ET AL.

It is certified that error appears in the above-identified patent and that said Letters Patent is hereby corrected as shown below:

<u>COLUMN 21</u>

Line 34, "different" should read --is different--.

<u>COLUMN 22</u>

Line 46, "reduced" should read --reduces--.

Signed and Sealed this

Eleventh Day of August 1998

Attest:

BRUCE LEHMAN

Attesting Officer    Commissioner of Patents and Trademarks